US011475836B2

(12) United States Patent
Kim et al.

(10) Patent No.: US 11,475,836 B2
(45) Date of Patent: *Oct. 18, 2022

(54) DISPLAY DEVICE AND DRIVING METHOD THEREOF

(71) Applicant: SAMSUNG DISPLAY CO., LTD., Yongin-si (KR)

(72) Inventors: Yang Wan Kim, Yongin-si (KR); Sun Ja Kwon, Yongin-si (KR); Byung Sun Kim, Yongin-si (KR); Hyun Ae Park, Yongin-si (KR); Hyung Jun Park, Yongin-si (KR); Su Jin Lee, Yongin-si (KR); Jae Yong Lee, Yongin-si (KR); Yu Jin Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,812

(22) Filed: Apr. 13, 2021

(65) Prior Publication Data

US 2021/0233472 A1 Jul. 29, 2021

Related U.S. Application Data

(63) Continuation of application No. 16/673,012, filed on Nov. 4, 2019, now Pat. No. 10,977,994, which is a (Continued)

(30) Foreign Application Priority Data

Sep. 9, 2016 (KR) ........................ 10-2016-0116313

(51) Int. Cl.

*G06F 3/038* (2013.01)
*G09G 3/3233* (2016.01)

(52) U.S. Cl.

CPC .................... *G09G 3/3233* (2013.01); *G09G 2300/0439* (2013.01); *G09G 2300/0861* (2013.01);

(Continued)

(58) Field of Classification Search

CPC ......... G09G 3/3233; G09G 2300/0439; G09G 2300/0861; G09G 2310/0251;

(Continued)

(56) References Cited

U.S. PATENT DOCUMENTS

| | | | |
|---|---|---|---|
| 7,525,526 | B2 | 4/2009 | Brown Elliott et al. |
| 8,462,099 | B2 | 6/2013 | Horiuchi et al. |

(Continued)

FOREIGN PATENT DOCUMENTS

| | | |
|---|---|---|
| CN | 101339729 | 1/2009 |
| CN | 101779227 | 7/2010 |

(Continued)

OTHER PUBLICATIONS

Extended European Search Report dated Mar. 14, 2018 in corresponding European Patent Application No. 17190065.7.

(Continued)

*Primary Examiner* — Th N Pardo
(74) *Attorney, Agent, or Firm* — F. Chau & Associates, LLC

(57) ABSTRACT

A display device includes a first pixel area having first pixels and a second pixel area having second pixels. Each first pixel includes a driving transistor initialized to a voltage of a first initialization power supply. Each second pixel includes a driving transistor initialized to a voltage of a second initialization power supply. The first initialization power supply and the second initialization power supply are set to different voltages. The first pixel area and the second pixel area have different widths.

6 Claims, 34 Drawing Sheets

Related U.S. Application Data continuation of application No. 15/680,522, filed on Aug. 18, 2017, now Pat. No. 10,467,958.

(52) U.S. Cl.
CPC ............... *G09G 2310/0251* (2013.01); *G09G 2310/0262* (2013.01); *G09G 2310/08* (2013.01); *G09G 2320/0223* (2013.01); *G09G 2320/0233* (2013.01); *G09G 2330/02* (2013.01)

(58) Field of Classification Search
CPC ....... G09G 2310/0262; G09G 2310/08; G09G 2320/0223; G09G 2320/0233; G09G 2330/02; G09G 3/3258; G09G 2330/028
USPC ....... 345/80, 98, 694, 76, 82, 212, 204, 690; 359/230
See application file for complete search history.

(56) References Cited

U.S. PATENT DOCUMENTS

| | | | | |
|---|---|---|---|---|
| 9,224,357 | B2 | 12/2015 | Kim et al. | |
| 9,269,295 | B2 | 2/2016 | Kim et al. | |
| 10,467,958 | B2 | 11/2019 | Kim et al. | |
| 2006/0022969 | A1 | 2/2006 | Lee et al. | |
| 2006/0028408 | A1* | 2/2006 | Kim | G09G 3/3233 345/76 |
| 2007/0085781 | A1 | 4/2007 | Chung et al. | |
| 2008/0246697 | A1 | 10/2008 | Kim | |
| 2008/0266282 | A1 | 10/2008 | Kim et al. | |
| 2009/0021509 | A1 | 1/2009 | Lee et al. | |
| 2009/0168005 | A1 | 7/2009 | Kim et al. | |
| 2010/0164928 | A1* | 7/2010 | Shin | G02B 26/02 359/230 |
| 2010/0231496 | A1* | 9/2010 | Yu | G09G 3/20 345/98 |
| 2011/0279437 | A1* | 11/2011 | Komiya | G09G 3/3233 345/212 |
| 2012/0013817 | A1 | 1/2012 | Kim et al. | |
| 2013/0027282 | A1* | 1/2013 | Kimura | H05K 1/148 345/80 |
| 2013/0313999 | A1 | 11/2013 | Kim et al. | |
| 2013/0335395 | A1 | 12/2013 | Zhan et al. | |
| 2014/0021870 | A1 | 1/2014 | An et al. | |
| 2014/0028649 | A1 | 1/2014 | Kim et al. | |
| 2014/0118409 | A1* | 5/2014 | Jun | G09G 3/3233 345/690 |
| 2014/0139510 | A1* | 5/2014 | Han | G09G 3/3233 345/82 |
| 2014/0300529 | A1 | 10/2014 | Kim et al. | |
| 2014/0347401 | A1* | 11/2014 | Hwang | G09G 3/3233 345/82 |
| 2014/0354621 | A1* | 12/2014 | Shin | G09G 3/3233 345/212 |
| 2015/0009194 | A1 | 1/2015 | Kim et al. | |
| 2015/0022514 | A1 | 1/2015 | Lee et al. | |
| 2015/0310796 | A1 | 10/2015 | Hwang et al. | |
| 2016/0005346 | A1 | 1/2016 | Kim | |
| 2016/0019841 | A1* | 1/2016 | Woo | G09G 3/3233 345/204 |
| 2016/0019844 | A1* | 1/2016 | Yang | G09G 3/3233 345/82 |
| 2016/0203764 | A1 | 7/2016 | In et al. | |
| 2016/0217735 | A1 | 7/2016 | Park et al. | |
| 2017/0069268 | A1 | 3/2017 | Tokunaga et al. | |
| 2018/0075804 | A1 | 3/2018 | Kim et al. | |
| 2020/0118490 | A1 | 4/2020 | Kim et al. | |

FOREIGN PATENT DOCUMENTS

| | | |
|---|---|---|
| CN | 103578415 | 2/2014 |
| EP | 2626851 | 8/2013 |
| EP | 3051529 | 8/2016 |
| KR | 1020080060886 | 7/2008 |
| KR | 10200800060886 | 7/2008 |
| KR | 10-2013-0141153 | 12/2013 |
| KR | 10-1351247 | 1/2014 |
| KR | 10-2014-0014694 | 2/2014 |
| KR | 1020140014671 | 2/2014 |
| KR | 10-1376654 | 3/2014 |
| KR | 1020160005859 | 1/2016 |
| WO | 2012023467 | 2/2012 |
| WO | 2015132834 | 9/2015 |

OTHER PUBLICATIONS

European Search Report dated Nov. 2, 2017 in corresponding European Patent Application No. 17190065.7.

Notice of Allowance dated Dec. 4, 2020 in Corresponding U.S. Appl. No. 16/673,012.

Office Action dated Jun. 11, 2020 in Corresponding U.S. Appl. No. 16/673,012.

Office Action issued from the Chinese Patent Office dated Aug. 25, 2021 in corresponding Chinese Patent Application No. 201710804296.6 filed on Sep. 8, 2017.

* cited by examiner

DISPLAY DEVICE AND DRIVING METHOD THEREOF

CROSS-REFERENCE TO RELATED APPLICATION

This application is a continuation of U.S. patent application Ser. No. 16/673,012 filed Nov. 4, 2019 which claims priority to U.S. patent application Ser. No. 15/680,522 filed Aug. 18, 2017, issued as U.S. Pat. No. 10,467,958 on Nov. 5, 2019 that claims priority to Korean Patent Application No. 10-2016-0116313 filed in the Korean Intellectual Property Office on Sep. 9, 2016, the disclosures of which are incorporated by reference herein.

BACKGROUND

(1) Technical Field

An exemplary embodiment of the present invention relates to a display device and a driving method thereof, and more particularly, to a display device and a driving method thereof for improving a luminance difference.

(2) Discussion of Prior Art

An organic light emitting diode (OLED) display includes two electrodes and an organic emission layer. The organic emission layer is located between the two electrodes. Electrons injected from the first electrode and holes injected from the second electrode are combined into the organic emission layer to generate excitons that release energy and emit light.

Such an OLED display includes a plurality of pixels. Each pixel includes an organic light emitting diode as a self-emitting element, and each pixel is formed with wires and a plurality of thin film transistors.

Depending on the number of horizontally arranged pixels, lengths of the wires may vary, and accordingly, the wires may have different load values. When the wires have different load values, the display device may have a luminance difference due to differences in load values of the wires.

SUMMARY OF THE INVENTION

Accordingly, at least one embodiment of the present invention has been made to provide a display device and a driving method thereof for improving a luminance difference.

A display device according to an exemplary embodiment of the present invention includes: a first pixel area having first pixels and a second pixel area having second pixels. Each first pixel includes a first driving transistor initialized to a voltage of a first initialization power supply. Each second pixel includes a second driving transistor initialized to a voltage of a second initialization power supply. The first initialization power supply and the second initialization power supply are set to different voltages. The first pixel area and the second pixel area have different widths.

According to an exemplary embodiment, the first pixels and the second pixels receive the first initialization power supply and the second initialization power supply from a same power supply line.

According to an exemplary embodiment, a voltage of the first initialization power supply is supplied to the power supply line during a period in which the first driving transistors are initialized, and a voltage of the second initialization power supply is supplied to the power supply line during a period in which the second driving transistors are initialized.

According to an exemplary embodiment, the power supply line is positioned at one side of each of the first pixel area and the second pixel area.

According to an exemplary embodiment, the power supply line is positioned at opposite sides while interposing the first pixel area and the second pixel area therebetween.

According to an exemplary embodiment, the first pixels receive the first initialization power supply from a first power supply line, and the second pixels receive the second initialization power supply from a second power supply line.

According to an exemplary embodiment, the first power supply line is positioned at one side of the first pixel area, and the second power supply line is positioned at one side of the second pixel area.

According to an exemplary embodiment, the first power supply line is positioned at opposite sides while interposing the first pixel area therebetween, and the second power supply line is positioned at opposite sides while interposing the second pixel area therebetween.

According to an exemplary embodiment, the first power supply line is positioned at one side of the first pixel area, and the second power supply line is positioned at opposite sides while interposing the second pixel area therebetween.

According to an exemplary embodiment, the first pixel area has a wider width than the second pixel area.

According to an exemplary embodiment, each of the first pixels and the second pixels include: an organic light emitting diode (OLED); and a control transistor connected between the OLED and a node receiving the first initialization power supply or between the OLED and the node receiving the second initialization power supply.

According to an exemplary embodiment, the first initialization power supply is set to a lower voltage than the second initialization power supply.

According to an exemplary embodiment, the first pixels and the second pixels receive the first initialization power supply and the second initialization power supply from the same power supply line, and supply timings of the first initialization power supply and the second initialization power supply are set by a scan signal that is supplied to the first pixel area and the second pixel area.

According to an exemplary embodiment, the scan signal is sequentially supplied to the second pixel area and then to the first pixel area, a voltage of the second initialization power supply is supplied to the power supply line during a period in which the scan signal is supplied to at least part of the second pixel area, and a voltage of the first initialization power supply is supplied to the power supply line from a time point when the last scan signal is supplied to the second pixel area.

According to an exemplary embodiment, the second pixel area has a width that gradually decreases from a first width to a second width that is smaller than the first width.

According to an exemplary embodiment, the second pixel area is divided into a plurality of regions including at least one horizontal line.

According to an exemplary embodiment, the second initialization power supply is set to different voltages in each of the regions.

According to an exemplary embodiment, the display device further includes a third pixel area having third pixels, the third pixel area has the same width as the second pixel area, and each third pixel includes a driving transistor initialized to a voltage of the second initialization power supply.

According to an exemplary embodiment, the second pixel area is positioned in an upper part of the first pixel area at one side thereof, and the third pixel area is positioned in a lower part of the first pixel area at one side thereof.

According to an exemplary embodiment, the first pixels, the second pixels, and the third pixels receive voltages of the first initialization power supply and the second initialization power supply from the same power supply line.

According to an exemplary embodiment, the first pixels receive a voltage of the first initialization power supply from a first power supply line, and the second pixels and the third pixels receive a voltage of the second initialization power supply from a second power supply line.

According to an exemplary embodiment, the display device further includes a third pixel area having third pixels, a width of the third pixel area is different from that of the second pixel area, and each third pixel includes a driving transistor initialized to a voltage of a third initialization power supply that is different from those of the first initialization power supply and the second initialization power supply.

According to an exemplary embodiment, the second pixel area is positioned in an upper part of the first pixel area at one side thereof, and the third pixel area is positioned in a lower part of the first pixel area at one side thereof.

According to an exemplary embodiment, the first pixels, the second pixels, and the third pixels receive voltages of the first initialization power, the second initialization power supply, and the third initialization power supply from the same power supply line.

According to an exemplary embodiment, the first pixels receive a voltage of the first initialization power supply from a first power supply line, the second pixels receive a voltage of the second initialization power supply from a second power supply line, and the third pixels receive a voltage of the third initialization power supply from a third power supply line.

An exemplary embodiment of the present invention provides a driving method of a display device including first and second pixel areas having different widths. The driving method includes: supplying a voltage of a first initialization power supply to first pixels positioned in the first pixel area; and supplying a voltage of a second initialization power supply to second pixels positioned in the second pixel area. The first initialization power supply is different from the second initialization power supply.

According to an exemplary embodiment of the driving method, the first initialization power supply is supplied to a gate electrode of a first driving transistor included in each first pixel, and the second initialization power supply is supplied to a gate electrode of a second driving transistor included in each second pixel.

According to an exemplary embodiment, the first initialization power supply and the second initialization power supply are supplied to the first pixels and the second pixels by a same power supply line.

According to the exemplary embodiment, the first initialization power supply and the second initialization power supply may be supplied to the power supply line at different times.

According to an exemplary embodiment, the first initialization power supply is supplied to the first pixels by a first power supply line, and the second initialization power supply is supplied to the second pixels by a second power supply line.

According to an exemplary embodiment of the invention, a display including a first pixel area and a second pixel area is provided. The first pixel area includes first pixels. The second pixel area includes second pixels. Each first pixel includes a first driving transistor initialized to a voltage of a first initialization power supply. Each second pixel includes a second driving transistor initialized to a voltage of a second initialization power supply. The first initialization power supply and the second initialization power supply are set to different voltages. The first pixel area has a rectangular shape and the second pixel area has a trapezoidal shape.

According to an exemplary embodiment, each row of the first pixel area includes a same number of the first pixels and a first row of the second pixel area includes a lesser number of the second pixels than a second row of the second pixel area.

According to an exemplary embodiment, each first pixel includes a first control transistor and a first organic light emitting diode (OLED), a first node of the first control transistor connected to the first OLED, and a second node of the first control transistor receives the first initialization power supply, and each second pixel includes a second control transistor and a second organic light emitting diode (OLED), a first node of the second control transistor connected to the second OLED, and a second node of the second control transistor receives the second initialization power supply.

According to at least one exemplary embodiment, voltages of the first initialization power supply and the second initialization power supply are set to minimize a luminance difference between the first pixels and the second pixels.

DETAILED DESCRIPTION OF THE EXEMPLARY EMBODIMENTS

Figure 1A:
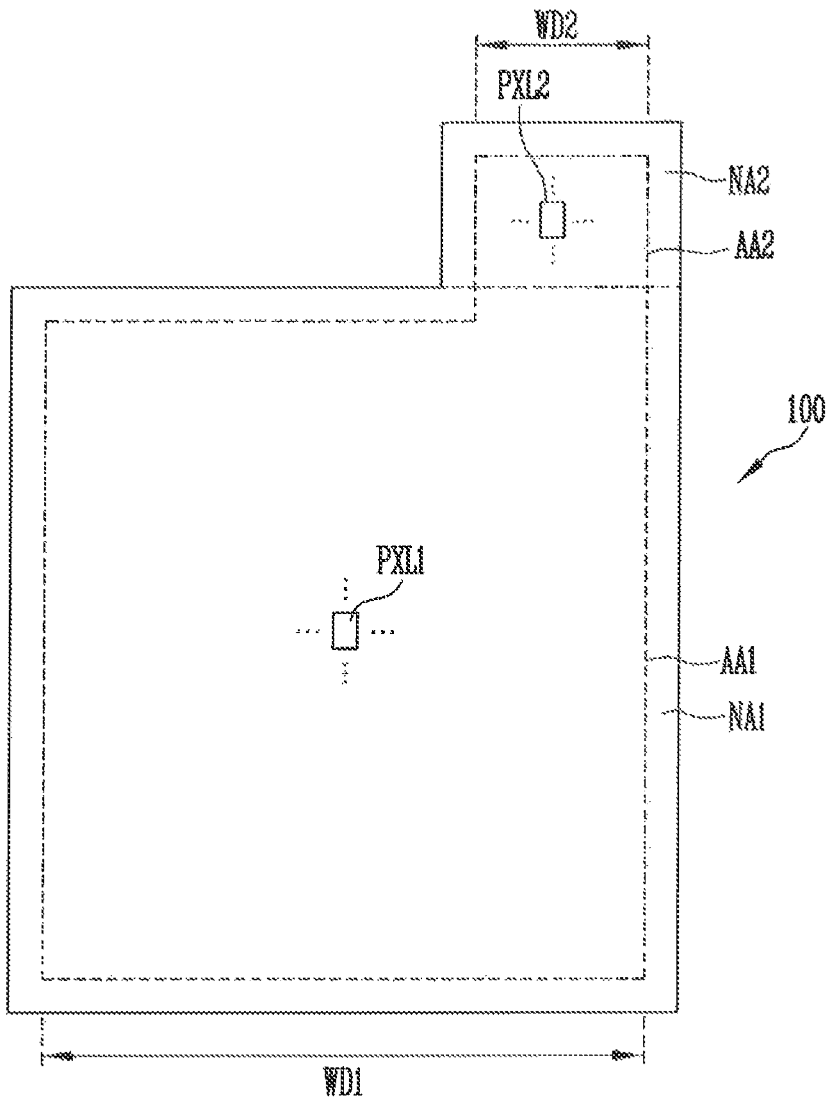
FIGS. 1A and 1B show a substrate according to exemplary embodiments of the present invention.

Hereinafter, exemplary embodiments of the present invention will be described in detail with reference to the accompanying drawings. However, the present invention may be implemented in various different ways without departing from the spirit or scope of the inventive concept.

That is, the present invention is not limited to the exemplary embodiments to be described below and may be implemented in various different forms. In the following description, when it is described that an element is "coupled" to another element, the element may be "directly coupled" to the other element or "electrically coupled" to the other element through a third element. It is to be noted that, in the drawings, the same constituent elements are denoted by the same reference numerals and symbols where possible even if they are shown in different drawings.

Figure 1B:
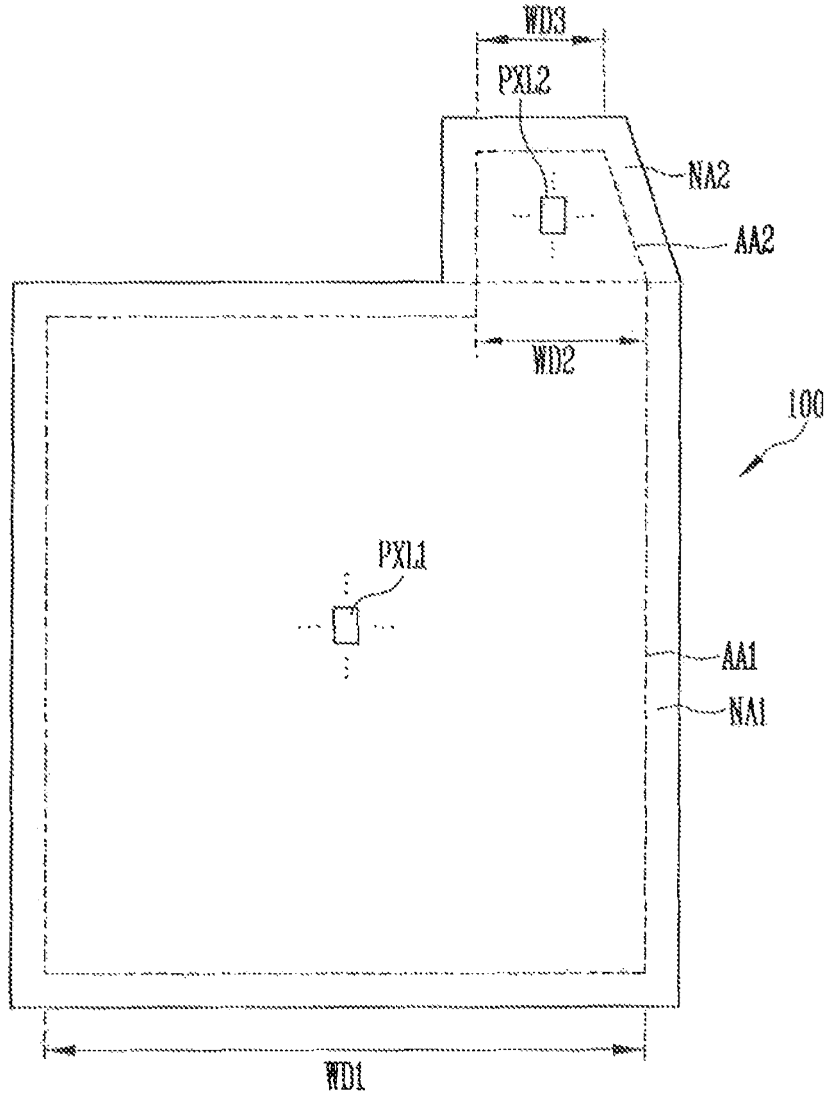

FIGS. 1A and 1B show substrates according to exemplary embodiments of the present invention.

Referring to FIG. 1A, a substrate 100 according to the current exemplary embodiment of the present invention includes pixel areas AA1 and AA2, and peripheral areas NA1 and NA2. Here, the pixel areas AA1 and AA2 may be set as a display area for displaying a predetermined image, and the peripheral areas NA1 and NA2 may be set as a non-display area.

The first pixel area AA1 has a first width WD1, and the second pixel area AA2 has a second width WD2. In an embodiment, the first width WD1 is greater than the second width WD2. In an embodiment, the first pixel area AA1 is greater than the second pixel area AA2.

In an exemplary embodiment of the present invention, the widths are determined by the number of pixels that are horizontally arranged in the corresponding pixel areas. Accordingly, more pixels may be horizontally disposed in the first pixel area AA1 than the second pixel area AA2.

First pixels PXL1 are formed in the first pixel area AA1 that has the first width WD. The first pixels PXL1 display a predetermined image in the first pixel area AA1.

Second pixels PXL2 are formed in the second pixel area AA2 that has the second width WD2. The second pixels PXL2 display a predetermined image in the second pixel area AA2.

The second pixel area AA2 may be positioned at one side of the first pixel area AA1. For example, the second pixel area AA2 may be formed to protrude from an upper part of the first pixel area AA1.

In an exemplary embodiment of the present invention, the second pixel area AA2 has the second width WD2, and may be formed at various positions adjacent to the first pixel area AA1. For example, the second pixel area AA2 may also be formed to protrude from a lower part of the first pixel area AA1.

Additionally, as shown in FIG. 1B, in an embodiment, at least some sides including a corner portion of the second pixel area AA2 are obliquely formed. For example, the second pixel area AA2 may have a trapezoidal shape having two sides that are not parallel to one another. In an embodiment, one of the two sides that are not parallel to one another is straight or substantially straight and the other side is slanted. In this embodiment, part of the second pixel area AA2 has a third width WD3 that is smaller than the second width WD2. For example, the second pixel area AA2 may have a width that gradually decreases from the second width WD2 to the third width WD3. When the width of the second pixel area AA2 gradually decreases from the second width WD2 to the third width WD3, at least one horizontal line may have different numbers of second pixels PXL2. For example, more second pixels PXL2 may be disposed in the horizontal line if it is included in the second pixel area AA2 that is adjacent to the first pixel area AA1. For example, a horizontal row within the second pixel area AA2 that is closest to first pixel area AA1 may have more pixels than a horizontal row within the second pixel area AA2 that is furthest from the first pixel area AA1.

As discussed above, at least some sides including the corner portion of the second pixel area AA2 may be obliquely formed, but may be differently formed. For example, the sides including the corner portion of the second pixel area AA2 may have a curved line shape with a predetermined curvature. Similarly, the sides including the corner portion of the first pixel area AA1 may be obliquely formed or curvedly formed.

In the peripheral areas NA1 and NA2, components (e.g., a driver and wires) for driving the pixels PXL1 and PXL2 may be positioned.

In an embodiment, the first peripheral area NA1 is present in a periphery of the first pixel area AA1, and surrounds at least some of the first pixel area AA1. The first peripheral area NA1 may substantially have the same width. However, the present invention is not limited thereto, and the first peripheral area NA1 may have a different width depending on its position.

In an embodiment, the second peripheral area NA2 is present in a periphery of the second pixel area AA2, and surrounds at least some of the second pixel area AA2. The second peripheral area NA2 may substantially have the same width. However, the present invention is not limited thereto, and the second peripheral area NA2 may have a different width depending on its position.

In an embodiment, the first pixels PXL1 and the second pixels PXL2 include a driving transistor (not shown) and an organic light emitting diode (OLED) (not shown), respectively. The driving transistor controls an amount of current supplied to the OLED according to a data signal. Before receiving the data signal, a gate electrode of the driving transistor is initialized to a voltage of an initialization power supply.

FIGS. 2A to 2D show exemplary embodiments of power supply lines formed on the substrate of FIG. 1A. In FIGS. 2A to 2D, for better understanding and ease of description, only a configuration of a power supply line of various components positioned in peripheral areas NA1 and NA2 is illustrated.

Figure 2A:
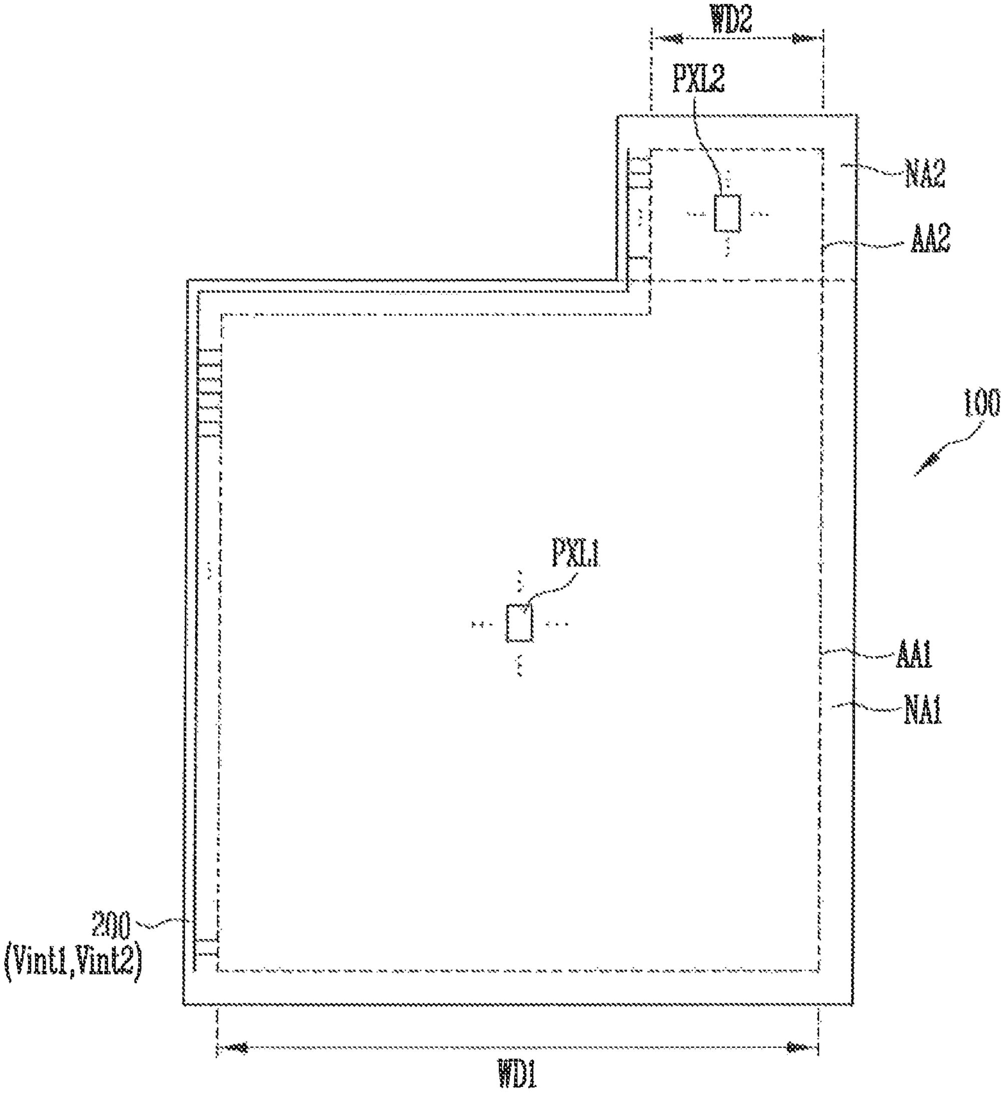
FIGS. 2A to 2D show exemplary embodiments of power supply lines formed on the substrate of FIG. 1A.

Referring to FIG. 2A, a power supply line 200 is positioned at one side of each of the first peripheral area NA1 and the second peripheral area NA2. The power supply line 200 is electrically coupled to the first pixels PXL1 and the second pixels PXL2.

The power supply line 200 is supplied with a first initialization power supply Vint1 and a second initialization power supply Vint2 from an outside source. In an embodiment, the outside source is a voltage generator. For example, while driving transistors included in the first pixels PXL1 are initialized, a voltage of the first initialization power supply Vint1 is supplied to the power supply line 200. In addition, while driving transistors included in the second pixels PXL2 are initialized, a voltage of the second initialization power supply Vint2 is supplied to the power supply line 200. That is, the first initialization power supply Vint1 and the second initialization power supply Vint2 are supplied to the power supply line 200 at different times.

In this case, the first initialization power supply Vint1 and the second initialization power supply Vint2 are set to different voltages. For example, the voltages of the first and second initialization power supplies Vint1 and Vint2 may be experimentally determined to compensate a luminance difference between the first pixel area AA1 and the second pixel area AA2. A detailed description regarding this will be made below with reference to circuit structures of the pixels PXL1 and PXL2.

Figure 2B:
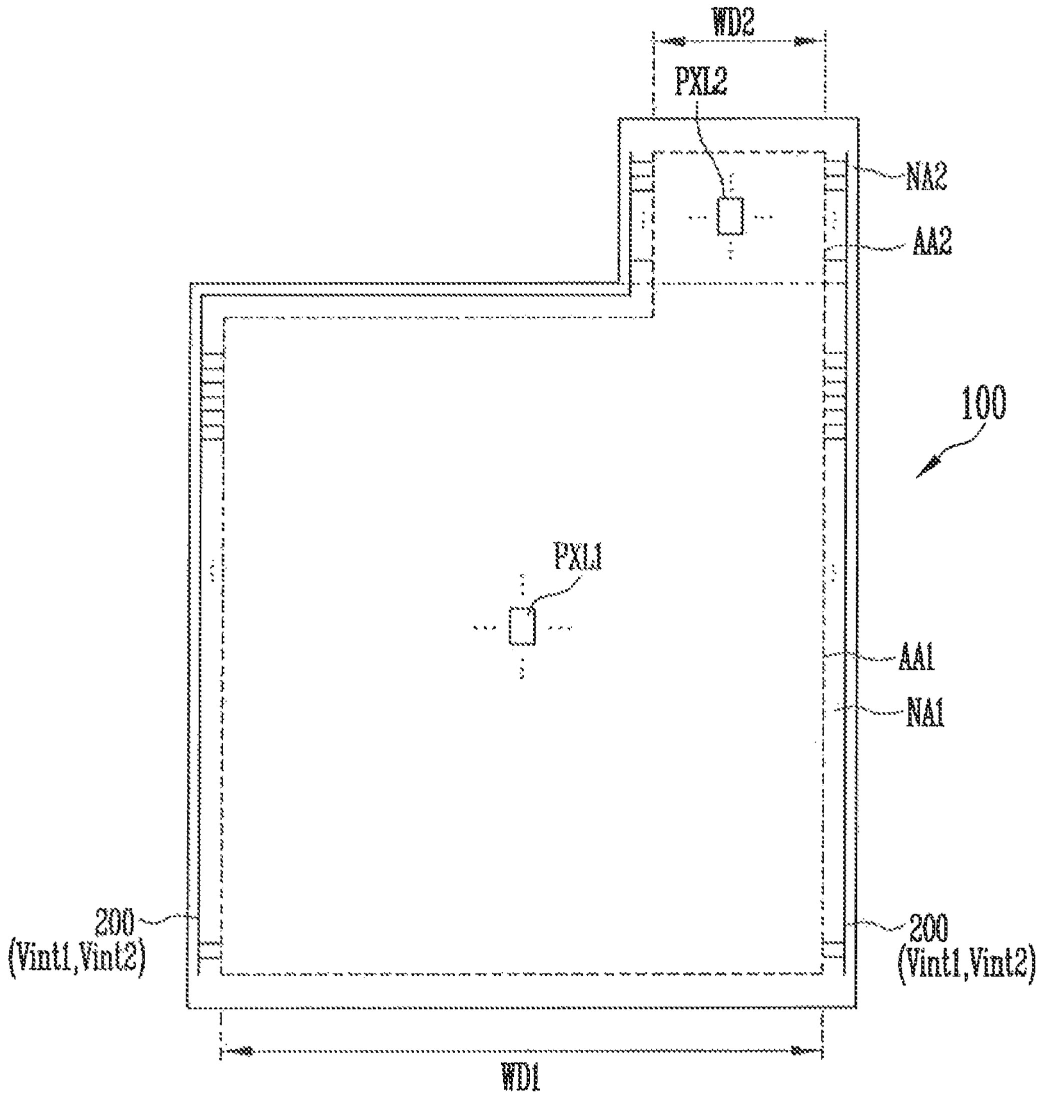

In an exemplary embodiment shown in FIG. 2B, a power supply line 200 is positioned at opposite sides of a first pixel area AA1 and a second pixel area AA2 while interposing a first peripheral area NA1 and a second peripheral area NA2 therebetween. The power supply line 200 may include a first power line and second power line, where the first peripheral area NA1 and the second peripheral area NA2 are positioned between the first and second power lines. For example, the first power line may be disposed to the left of the first and second peripheral areas NA1 and NA2, and the second power line may be disposed to the right of the first and second peripheral areas NA1 and NA2.

Figure 2C:
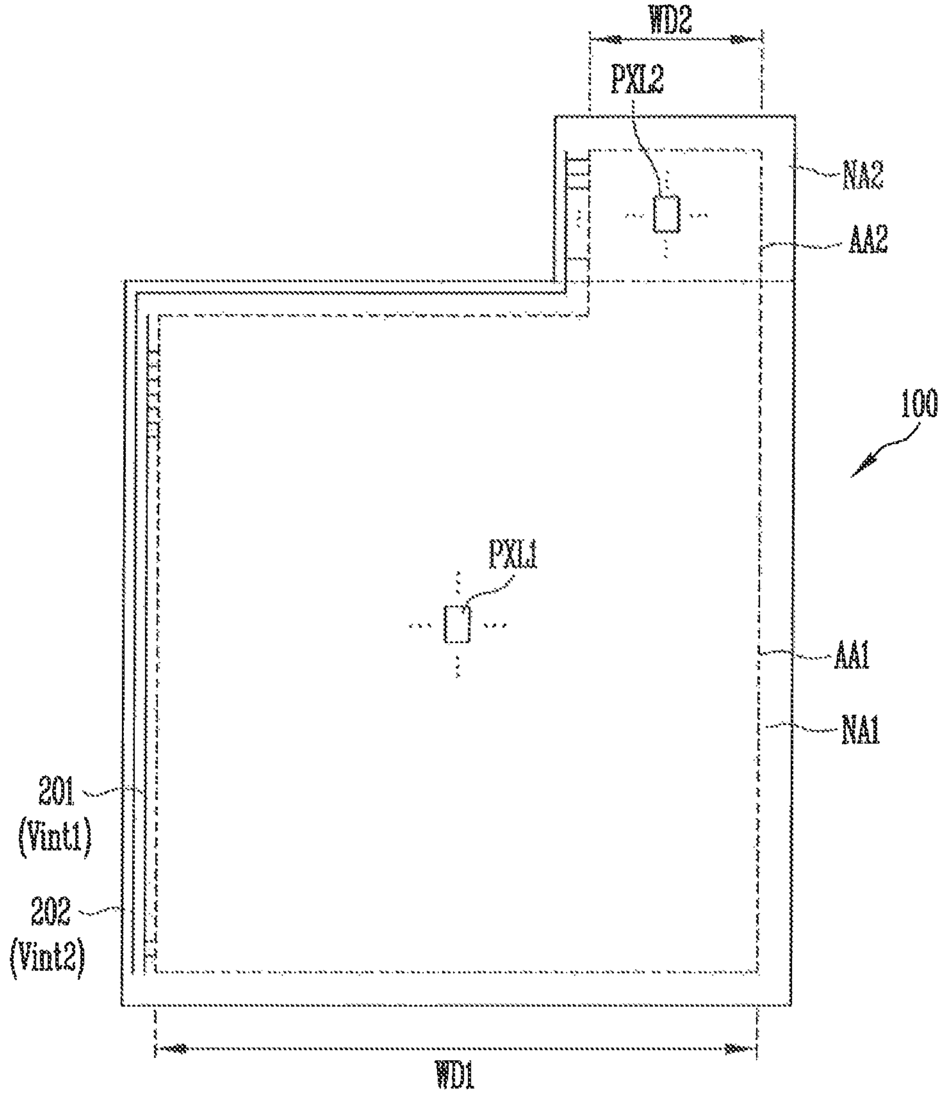

In an exemplary embodiment shown in FIG. 2C, a first power supply line 201 is positioned at one side of a first peripheral area NA1, and a second power supply line 202 is positioned at one side of a second peripheral area NA2. In this embodiment, the second power supply line 202 extends to the second peripheral area NA2 via the first peripheral area NA1. In an embodiment, the first power supply line 201 is located only in the first peripheral area NA1, and the second power supply line 202 is located in both the first and second peripheral areas NA1 and NA2. For example, the second power supply line 202 extends through the first peripheral area NA1 to the second peripheral area NA2 and continues to extend through the second peripheral area NA2.

The first power supply line 201 is electrically coupled to first pixels PXL1. The first power supply line 201 supplies a voltage of a first initialization power supply Vint1 to the first pixels PXL1.

The second power supply line 202 is electrically coupled to the second pixels PXL2. The second power supply line 202 supplies a voltage of a second initialization power supply Vint2 to the second pixels PXL2.

In this embodiment, the voltages of the first initialization power supply Vint1 and the second initialization power supply Vint2 are different, and may be experimentally determined to compensate for a luminance difference between a first pixel area AA1 and a second pixel area AA2.

Figure 2D:
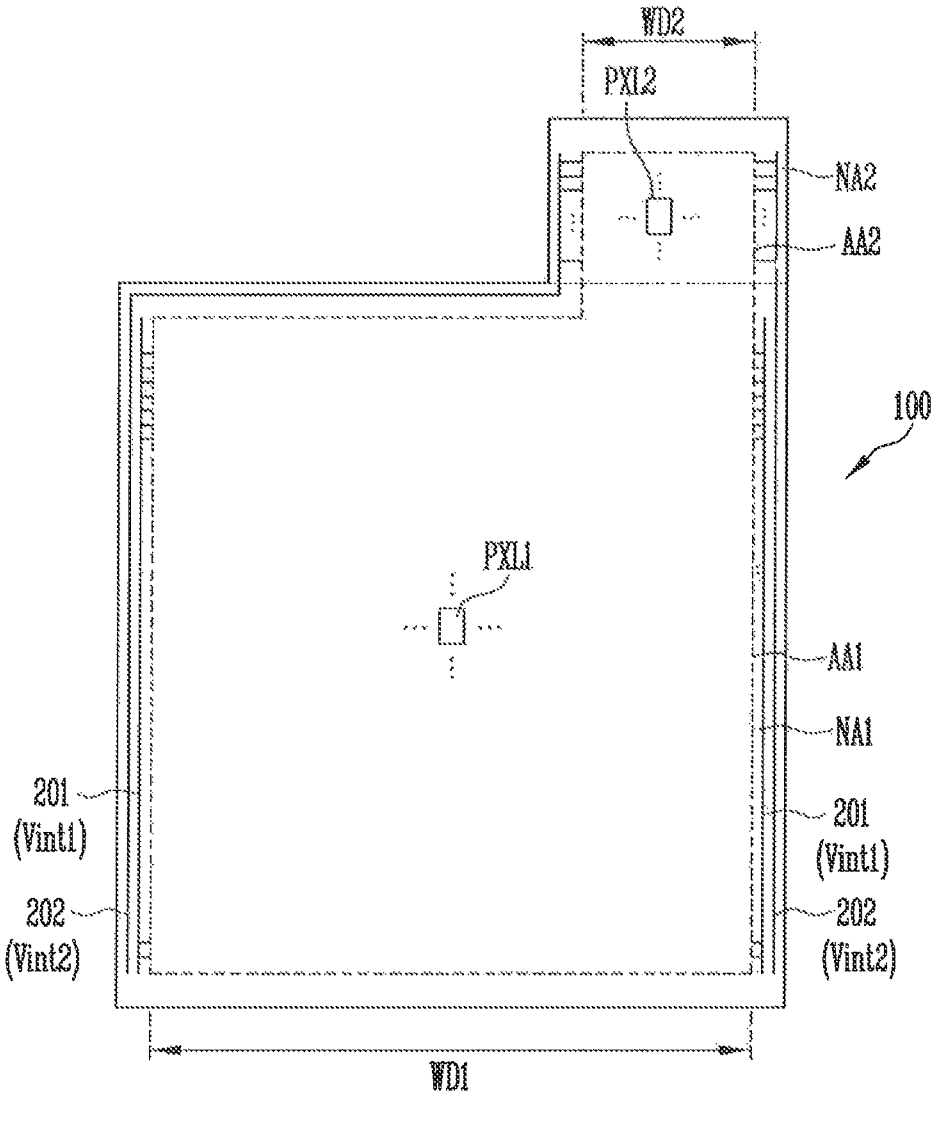

In the embodiment shown in FIG. 2D, a first power supply line 201 and a second power supply line 202 are positioned at opposite sides of a first peripheral area NA1 and a second peripheral area NA2 while interposing a first pixel area AA1 and a second pixel area AA2 therebetween. For example, the first power supply line 201 includes first and second power lines that are only located in the first peripheral area NA1, and the second power supply line 202 includes third and fourth power lines that are located in the first and second peripheral areas NA1 and NA2. For example, the first power line extends through the left side of the first peripheral area NA1 and the second power line extends through the right side of the first peripheral area NA1. For example, the third power line extends through the left side of the first and second peripheral areas NA1 and NA2, and the fourth power line extends through the right side of the first and second peripheral areas NA1 and NA2.

Additionally, in FIGS. 2A to 2D, the power supply lines 200, 201, and 202 formed in the substrate 100 illustrated in FIG. 1A are shown, but in FIG. 1B, the power supply lines 201, 201, and 202 may also be formed as in FIGS. 2A to 2D. For example, a power supply line may extend in an oblique direction when extended through the right side of the second peripheral area NA2.

Figure 3:
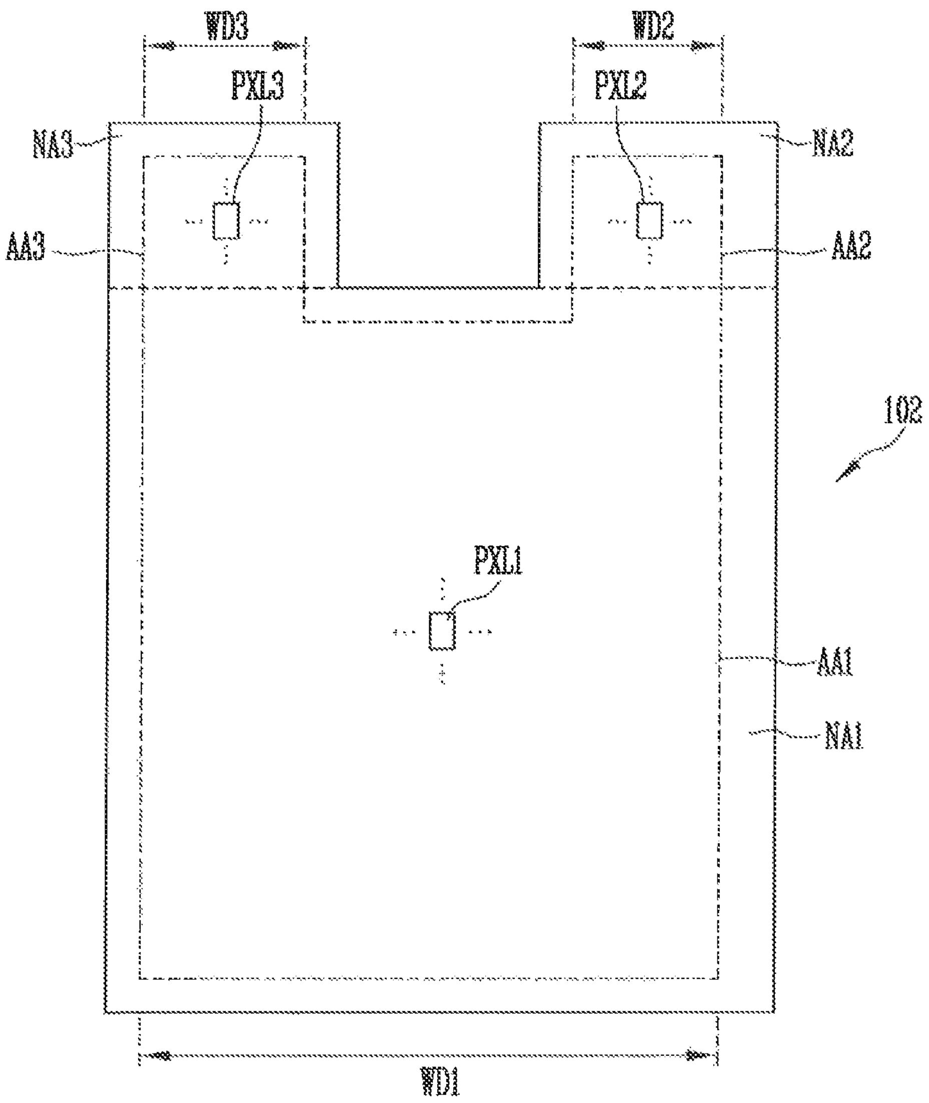
FIG. 3 shows a substrate according to an exemplary embodiment of the present invention.

FIG. 3 shows a substrate according to an exemplary embodiment of the present invention.

Referring to FIG. 3, a substrate 102 according to the current exemplary embodiment of the present invention includes pixel areas AA1, AA2, and AA3, and peripheral areas NA1, NA2, and NA3. Here, the pixel areas AA1, AA2, and AA3 are set as a display area for displaying a predetermined image, and the peripheral areas NA1, NA2, and NA3 are set as a non-display area.

The first pixel area AA1 has a first width WD1, the second pixel area AA2 has a second width WD2, and the third pixel area AA3 has a third width WD3. In an embodiment, the first width WD1 is greater than the second width WD2 and the third width WD3. In an embodiment, the first pixel area AA1 is greater than the second pixel area AA2 and the third pixel area AA3. Additionally, the second width WD2 and the third width WD3 may be the same as or different from each other.

First pixels PXL1 are formed in the first pixel area AA1 that has the first width WD1. The first pixels PXL1 display a predetermined image in the first pixel area AA1.

Second pixels PXL2 are formed in the second pixel area AA2 that has the second width WD2. The second pixels PXL2 display a predetermined image in the second pixel area AA2.

Third pixels PXL3 are formed in the third pixel area AA3 that has the third width WD3. The third pixels PXL3 display a predetermined image in the third pixel area AA3.

The second pixel area AA2 and the third pixel area AA3 may be positioned at one side of the first pixel area AA1. For example, the second pixel area AA2 may be formed to protrude from an upper right side of the first pixel area AA1, and the third pixel area AA3 may be formed to protrude from an upper left side of the first pixel area AA1. Additionally, the second pixel area AA2 and the third pixel area AA3 may be formed at various positions adjacent to the first pixel area AA1. For example, the second pixel area AA2 may be formed to protrude from a lower right side of the first pixel area AA1, and the third pixel area AA3 may be formed to protrude from a lower left side of the first pixel area AA1.

In an embodiment, at least some sides including corner portions of the first pixel area AA1, the second pixel area AA2, and/or the third pixel area AA3 are obliquely or curvedly formed.

In the peripheral areas NA1, NA2, and NA3, components (e.g., a driver and wires) for driving the pixels PXL1, PXL2, and PXL3 may be positioned.

The first peripheral area NA1 may be present in a periphery of the first pixel area AA1, and may surround at least some of the first pixel area AA1. The first peripheral area NA may have substantially the same width. However, the present invention is not limited thereto, and the first peripheral area NA1 may have a different width depending on its position.

The second peripheral area NA2 may be present in a periphery of the second pixel area AA2, and may surround at least some of the second pixel area AA2. The second peripheral area NA2 may have substantially the same width. However, the present invention is not limited thereto, and the second peripheral area NA2 may have a different width depending on its position.

The third peripheral area NA3 may be present in a periphery of the third pixel area AA3, and may surround at least some of the third pixel area AA3. The third peripheral area NA3 may have substantially the same width. However, the present invention is not limited thereto, and the third peripheral area NA3 may have a different width depending on its position.

The first pixels PXL1, the second pixels PXL2, and the third pixels PXL3 include a driving transistor and an OLED, respectively. The driving transistor controls an amount of current supplied to the OLED according to a data signal. Before receiving the data signal, a gate electrode of the driving transistor is initialized to a voltage of an initialization power supply.

Figure 4A:
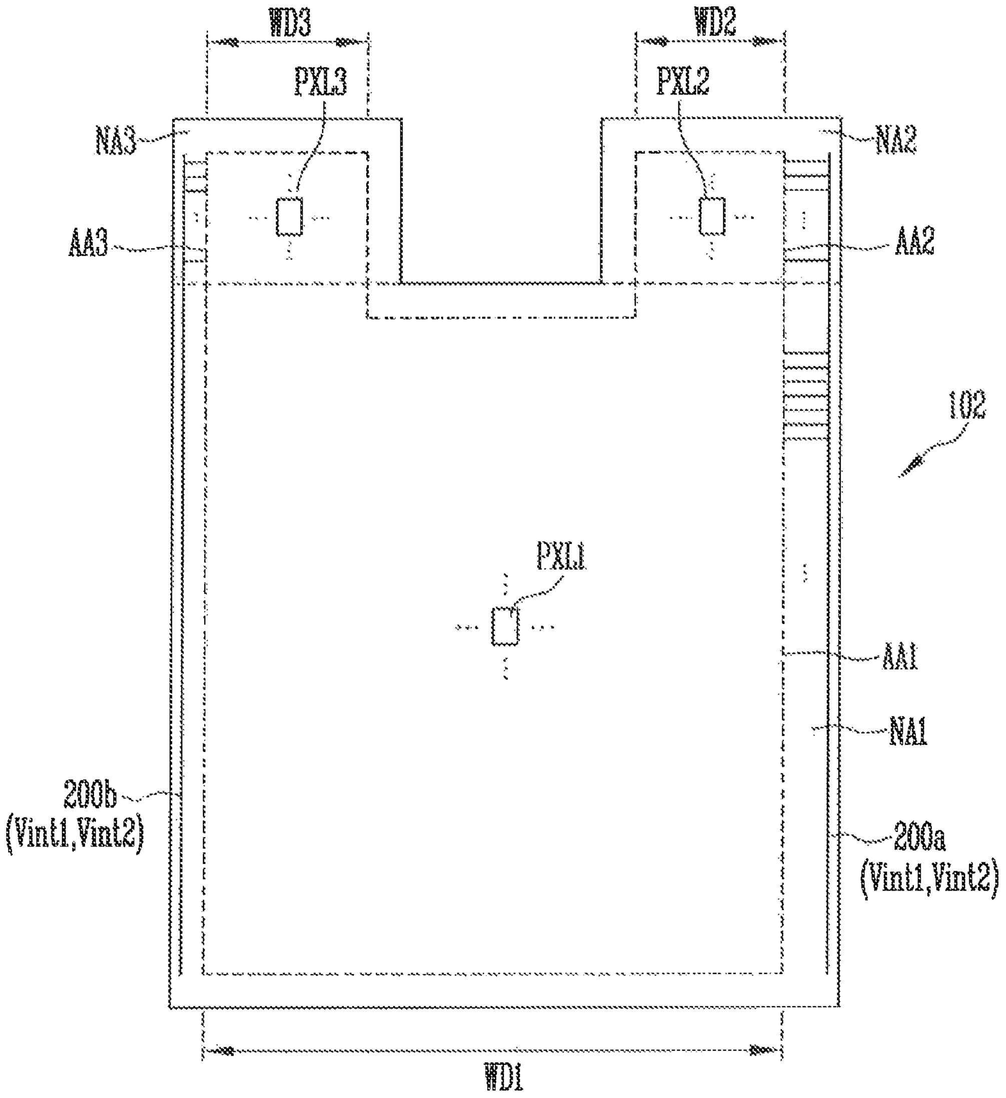
FIGS. 4A to 4C show exemplary embodiments of power supply lines formed on the substrate of FIG. 3.
Figure 4B:
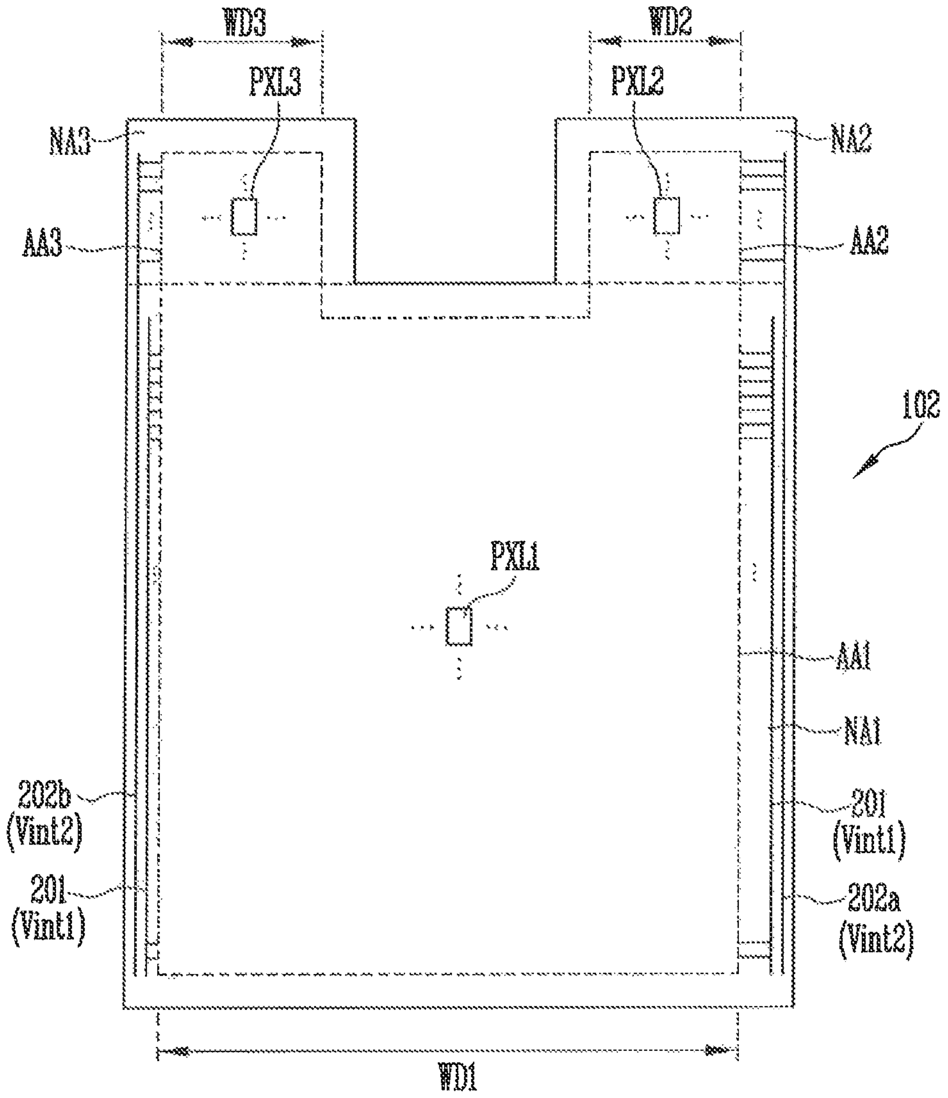
Figure 4C:
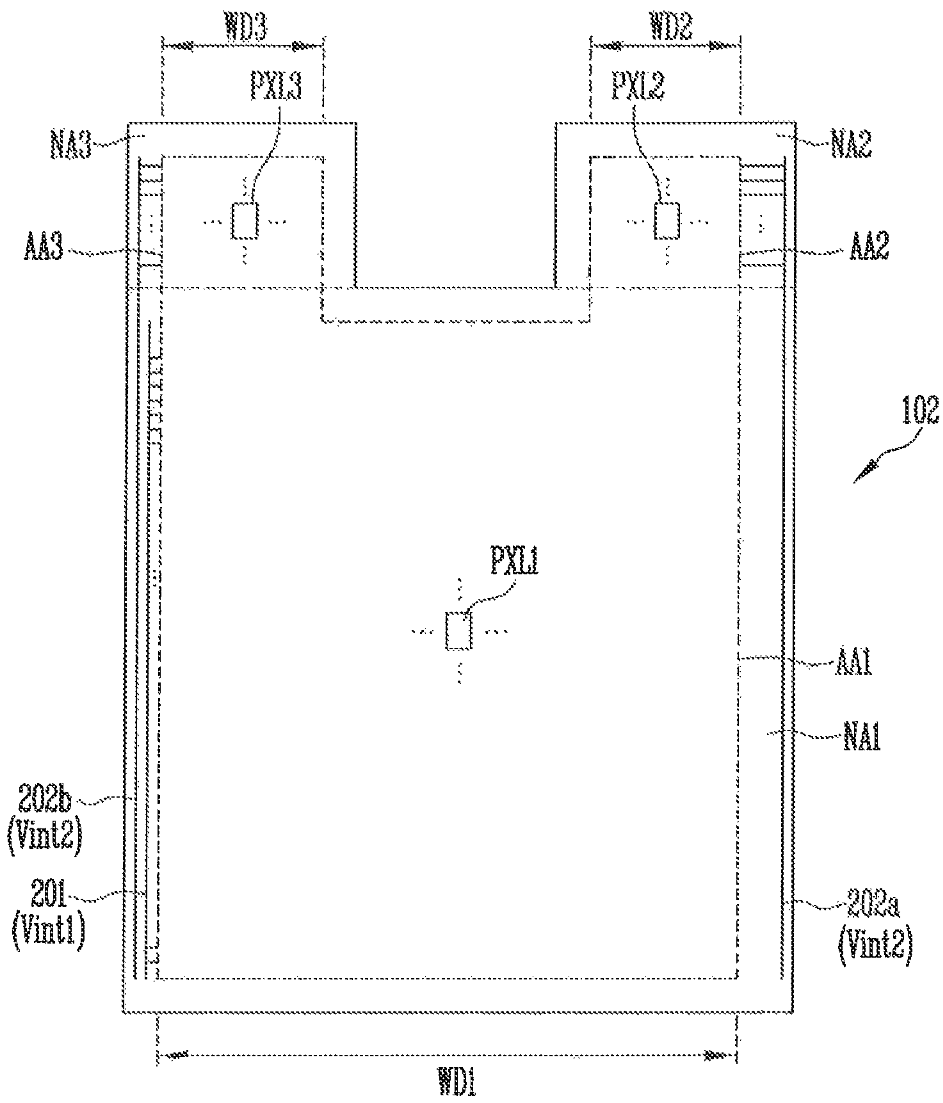

FIGS. 4A to 4C show an exemplary embodiment of power supply lines formed on the substrate of FIG. 3. In FIGS. 4A to 4C, for better understanding and ease of description, only a configuration of power supply lines of components positioned in peripheral areas NA1, NA2, and NA3 will be shown.

FIG. 4A shows a case where a second width WD2 and a third width WD3 are the same.

Referring to FIG. 4A, power supply lines 200*a* and 200*b* are positioned at opposite sides of a first peripheral area NA1. In addition, the first power supply line 200*a* of the power supply lines 200*a* and 200*b* is positioned at one side of a second peripheral area NA2 via the first peripheral area NA1, and the second power supply line 200*b* is positioned at one side of a third peripheral area NA3 via the first peripheral area NA1. For example, the first power supply line 200*a* extends through the right side of the first peripheral area NA1 to the second peripheral area NA2, and the second power supply line 200*b* extends through the left side of the first peripheral area NA2 to the third peripheral area NA3.

The first power supply line 200*a* is electrically coupled to first pixels PXL1 and second pixels PXL2. The second power supply line 200*b* is electrically coupled to the first pixels PXL1 and third pixels PXL3.

The power supply lines 200*a* and 200*b* are supplied with a first initialization power supply Vint1 and a second initialization power supply Vint2 from an outside source. For example, while driving transistors included in the first pixels PXL1 are initialized, a voltage of the first initialization power supply Vint1 is supplied to the power supply lines 200*a* and 200. In addition, while driving transistors included in the second pixels PXL2 and the third pixels PXL3 are initialized, a voltage of the second initialization power supply Vint2 is supplied to the power supply lines 200*a* and 200*b*.

In this case, the first initialization power supply Vint1 and the second initialization power supply Vint2 are set to different voltages. For example, the voltages of the first initialization power supply Vint1 and the second initialization power supply Vint2 may be experimentally determined to compensate for luminance differences between a first pixel area AA1, a second pixel area AA2, and a third pixel area AA3.

Referring to FIG. 4B, a first power supply line 201 is positioned at opposites sides of a first peripheral area NA1 while interposing a first pixel area AA1 therebetween. For example, a first power supply line 201 may include a first power line and second power line, where the first pixel area AA1 is disposed between the first and second power lines. A second power supply line 202*a* is positioned at one side of a second peripheral area NA2, and a third power supply line 202*b* is positioned at one side of a third peripheral area NA3. In this case, the second power supply line 202*a* may be extended to the second peripheral area NA2 via the first peripheral area NA1. In addition, the third power supply line 202*b* may be extended to the third peripheral area NA3 via the first peripheral area NA1.

The first power supply line 201 is electrically coupled to first pixels PXL1. The first power supply line 201 supplies a voltage of the first initialization power supply Vint1 to the first pixels PXL1.

The second power supply line 202*a* is electrically coupled to second pixels PXL2. The second power supply line 202*a* supplies a voltage of the second initialization power supply Vint2 to the second pixels PXL2.

The third power supply line 202*b* is electrically coupled to the third pixels PXL3. The third power supply line 202*b* supplies the voltage of the second initialization power supply Vint2 to the third pixels PXL3.

In this case, the voltages of the first initialization power supply Vint1 and the second initialization power supply Vint2 are set to be different from each other, and are set to compensate for luminance differences between a first pixel area AA1, a second pixel area AA2, and a third pixel area AA3.

In an exemplary embodiment of the present invention shown in FIG. 4C, a first power supply line 201 is positioned at one side of a first peripheral area NA1.

Figure 5A:
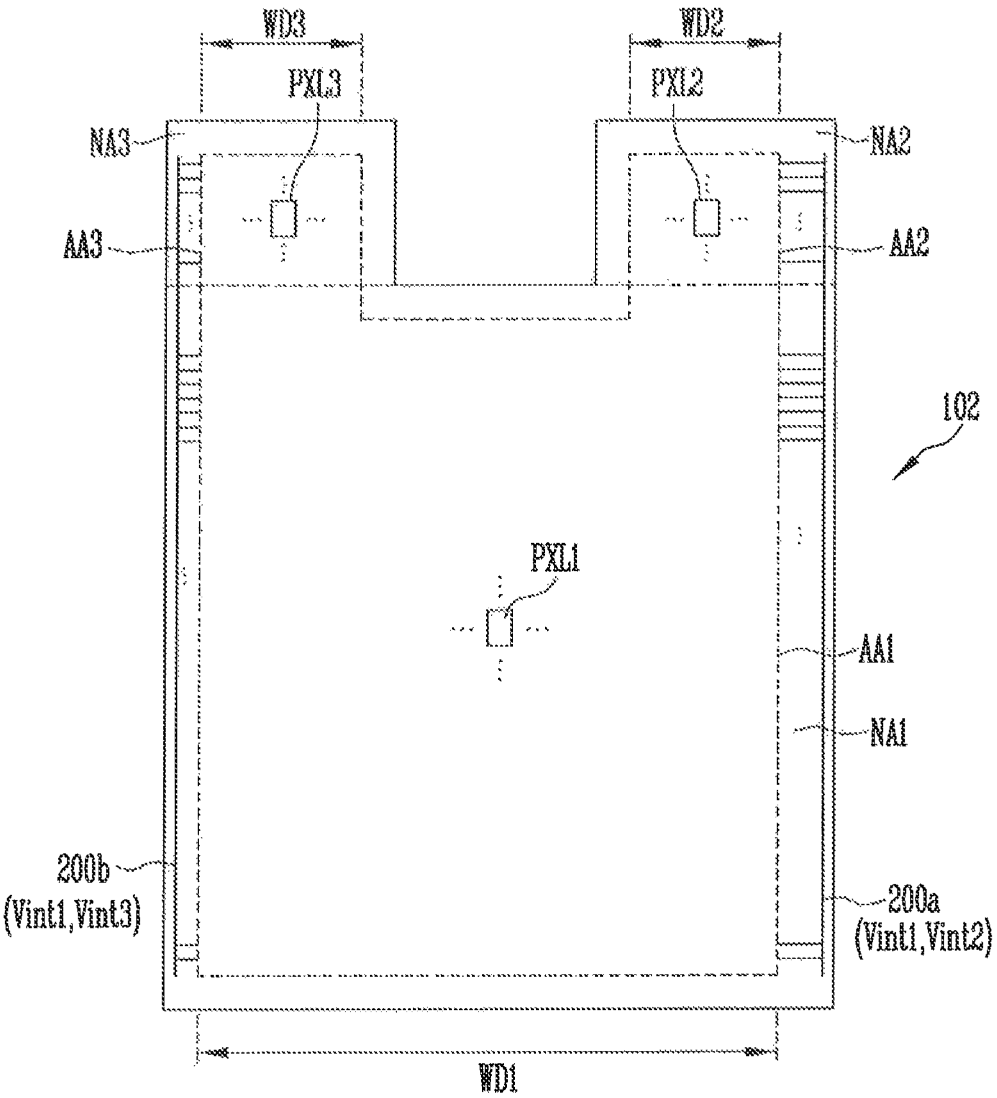
FIGS. 5A to 5C show exemplary embodiments of power supply lines formed on the substrate of FIG. 3.
Figure 5B:
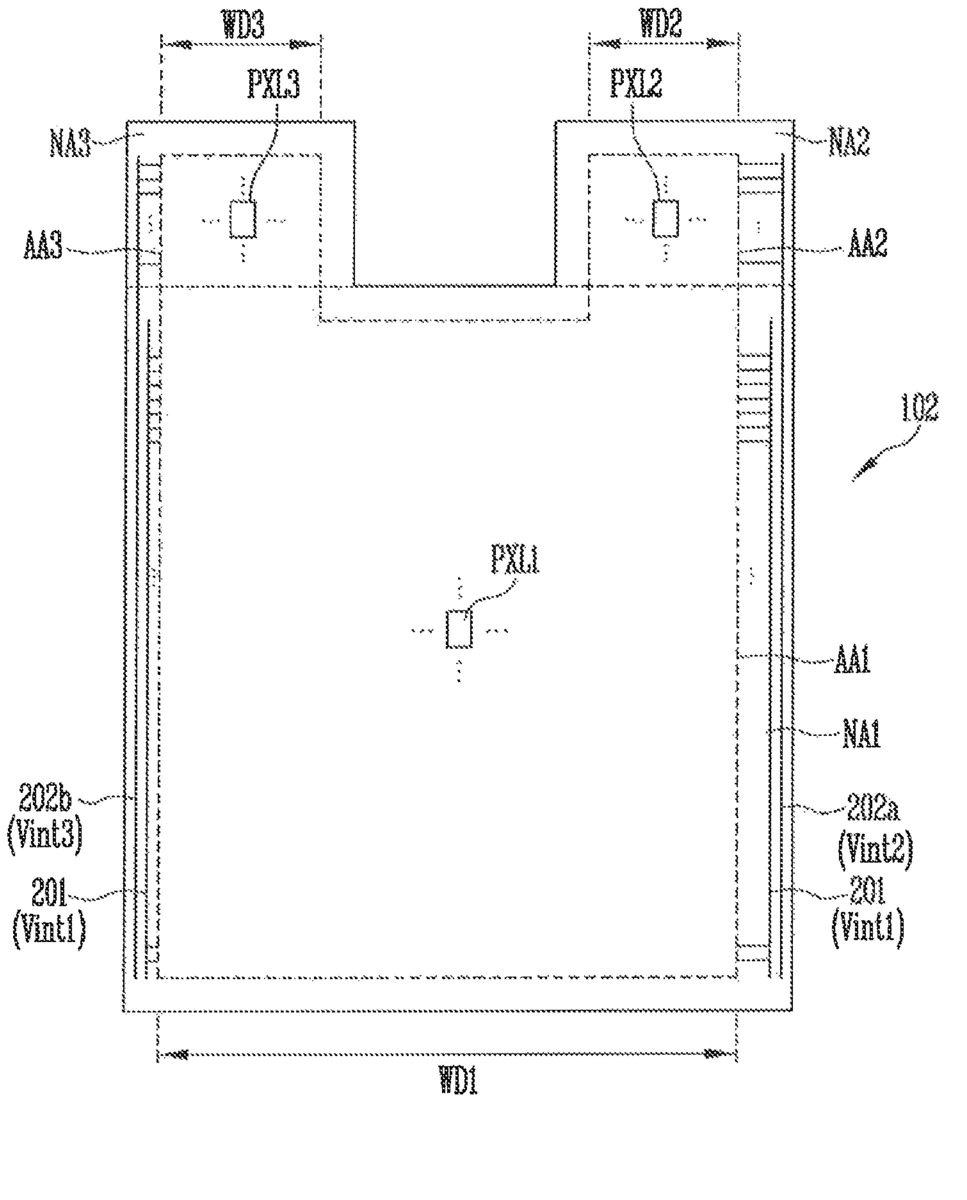
Figure 5C:
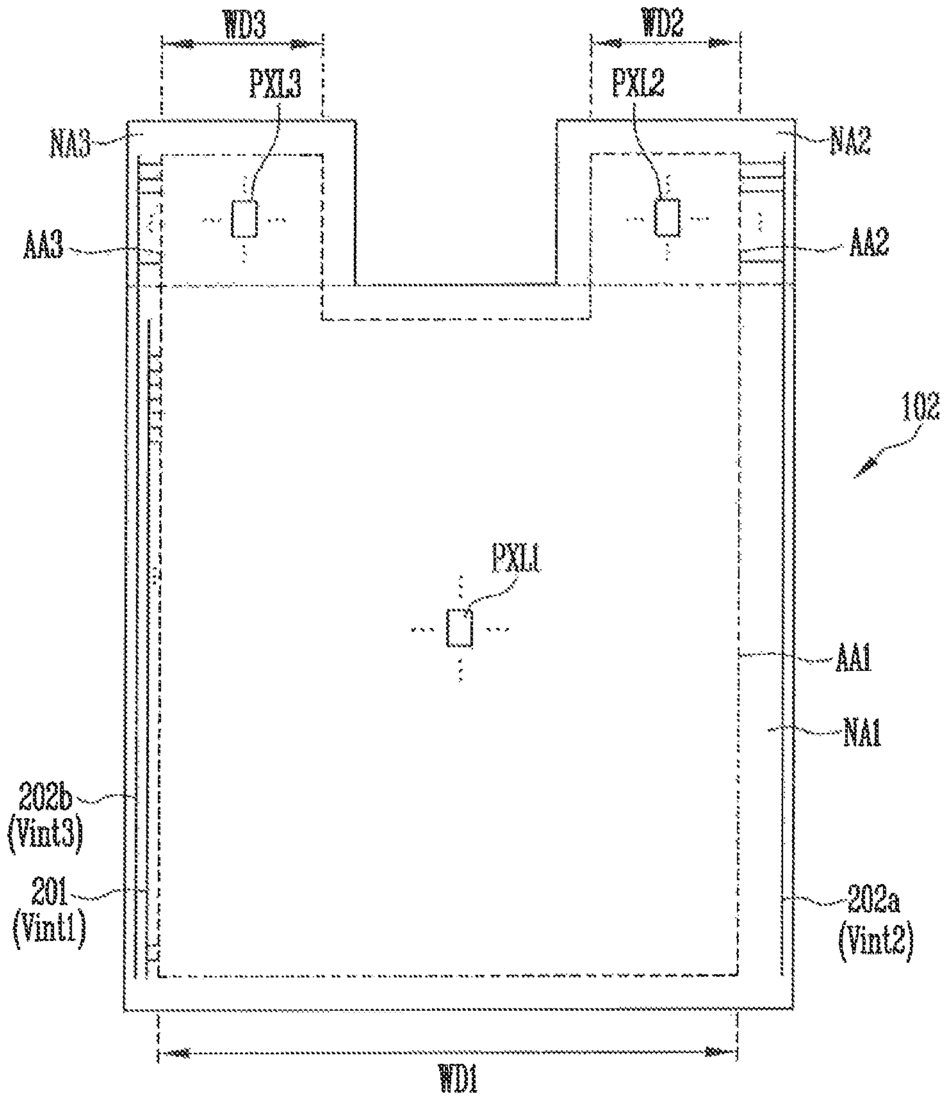

While an embodiment where a second width WD2 and a third width WD3 are the same is shown, the present invention is not limited thereto. For example, in an embodiment in which a second width WD2 and a third width WD3 are different, as shown in FIG. 5A to FIG. 5C, third pixels PXL3 may be supplied with a third initialization power supply Vint3.

In this embodiment, the first initialization power supply Vint1, the second initialization power supply Vint2, and the third initialization power supply Vint3 are set to compensate for luminance differences between the first pixel area AA1, the second pixel area AA2, and the third pixel area AA3.

Figure 6:
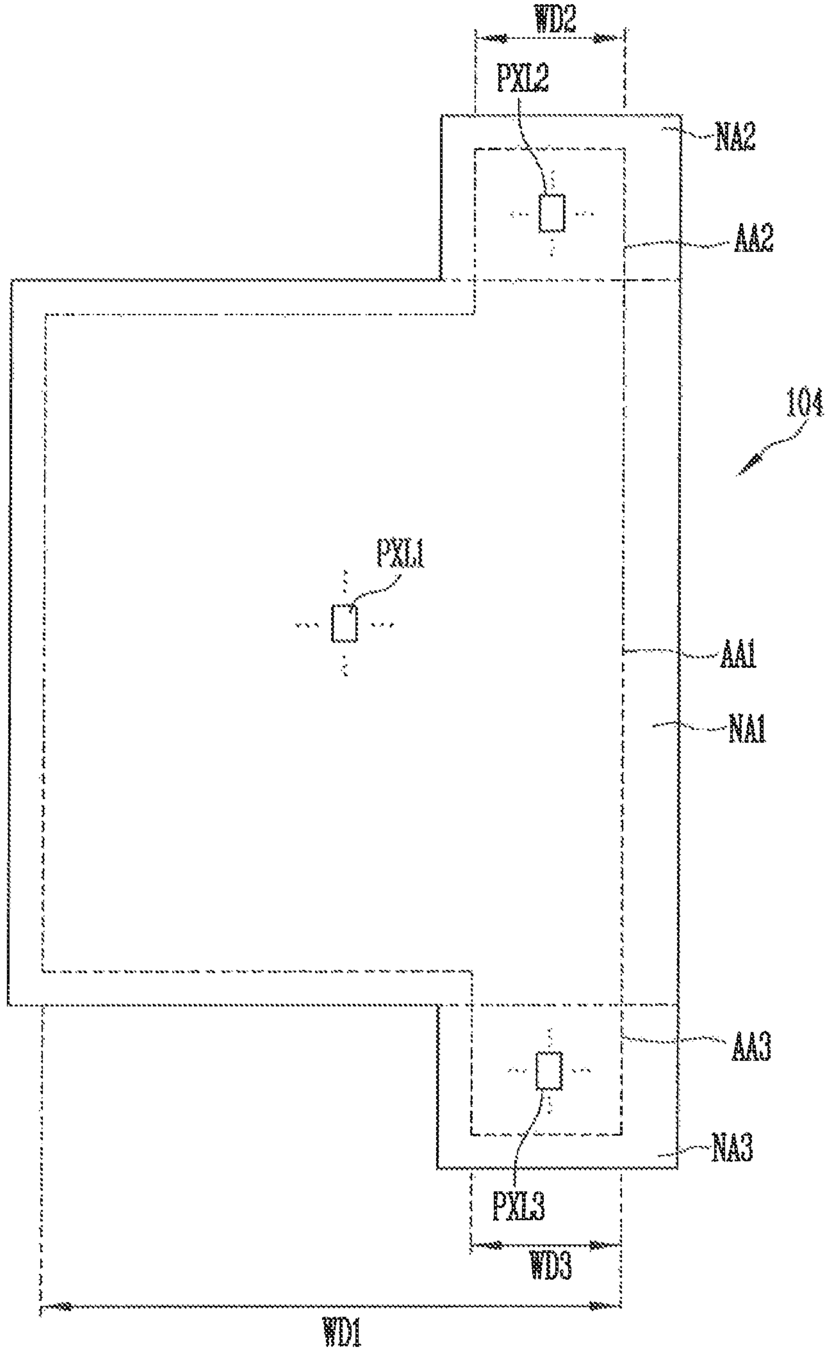
FIG. 6 shows a substrate according to an exemplary embodiment of the present invention.

FIG. 6 shows a substrate according to an exemplary embodiment of the present invention.

Referring to FIG. 6, a substrate 104 according to the current exemplary embodiment of the present invention includes pixel areas AA1, AA2, and AA3, and peripheral areas NA1, NA2, and NA3. The pixel areas AA1, AA2, and AA3 are set as a display area for displaying a predetermined image, and the peripheral areas NA1, NA2, and NA3 are set as a non-display area.

The first pixel area AA1 has a first width WD1, the second pixel area AA2 has a second width WD2, and the third pixel area AA3 has a third width WD3. In an embodiment, the first width WD1 is greater than the second width WD2 and the third width WD3. In an embodiment, the first pixel area AA1 is greater than the second pixel area AA2 and the third pixel area AA3. Additionally, the second width WD2 and the third width WD3 may be the same as or different from each other.

First pixels PXL1 are formed in the first pixel area AA1 that has the first width WD1. The first pixels PXL1 display a predetermined image in the first pixel area AA1.

Second pixels PXL2 are formed in the second pixel area AA2 that has the second width WD2. The second pixels PXL2 display a predetermined image in the second pixel area AA2.

Third pixels PXL3 are formed in the third pixel area AA3 that has the third width WD3. The third pixels PXL3 display a predetermined image in the third pixel area AA3.

The second pixel area AA2 may be formed to protrude from an upper part of the first pixel area AA1 at one side thereof. In addition, the third pixel area AA3 may be formed to protrude from a lower part of the first pixel area AA1 at one side thereof.

In an embodiment, at least some sides including corner portions of the first pixel area AA1, the second pixel area AA2, and/or the third pixel area AA3 are obliquely or curvedly formed.

In the peripheral areas NA1, NA2, and NA3, components (e.g., a driver and wires) for driving the pixels PXL1, PXL2, and PXL3 may be positioned.

The first peripheral area NA1 may be present in a periphery of the first pixel area AA1, and may surround at least some of the first pixel area AA1. The first peripheral area NA may have substantially the same width. However, the present invention is not limited thereto, and the first peripheral area NA1 may have a different width depending on its position.

The second peripheral area NA2 may be present in a periphery of the second pixel area AA2, and may surround at least some of the second pixel area AA2. The second peripheral area NA2 may have substantially the same width. However, the present invention is not limited thereto, and the second peripheral area NA2 may have a different width depending on its position.

The third peripheral area NA3 may be present in a periphery of the third pixel area AA3, and may surround at least some of the third pixel area AA3. The third peripheral area NA3 may have substantially the same width. However, the present invention is not limited thereto, and the third peripheral area NA3 may have a different width depending on its position.

The first pixels PXL1, the second pixels PXL2, and the third pixels PXL3 include a driving transistor and an OLED, respectively. The driving transistor controls an amount of current supplied to the OLED according to a data signal. Before receiving the data signal, a gate electrode of the driving transistor is initialized to a voltage of an initialization power supply.

FIGS. 7A to 7D show exemplary embodiments of power supply lines formed on the substrate of FIG. 6. In FIGS. 7A to 7D, for better understanding and ease of description, only a configuration of power supply lines of components positioned in peripheral areas NA1, NA2, and NA3 will be shown.

Figure 7A:
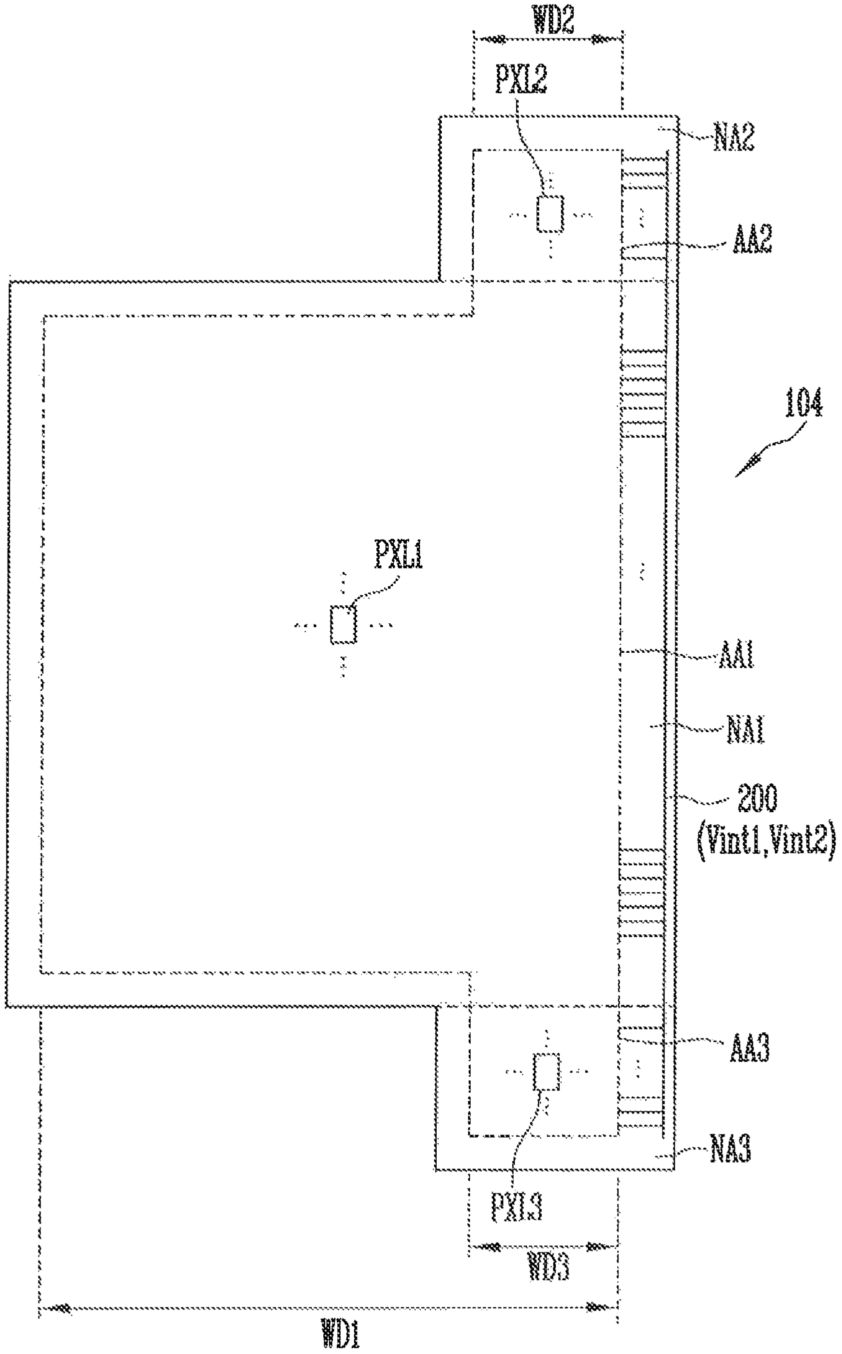
FIGS. 7A to 7D show exemplary embodiments of power supply lines formed on the substrate of FIG. 6.

FIG. 7A shows a case where a second width WD2 and a third width WD3 are the same.

Referring to FIG. 7A, a power supply line 200 is positioned at one side of a first peripheral area NA1, a second peripheral area NA2, and a third peripheral area. The power supply line 200 is electrically coupled to second pixels PXL2, first pixels PXL1, and third pixels PXL3.

The power supply line 200 is supplied with a first initialization power supply Vint1 and a second initialization power supply Vint2 from an outside source. For example, while driving transistors included in the first pixels PXL1 are initialized, a voltage of the first initialization power supply Vint1 is supplied to the power supply line 200. In addition, while driving transistors included in the second pixels PXL2 and the third pixels PXL3 are initialized, a voltage of the second initialization power supply Vint2 is supplied to the power supply line 200.

In this case, the first initialization power supply Vint1 and the second initialization power supply Vint2 are set to different voltages. For example, the voltages of the first initialization power supply Vint1 and the second initialization power supply Vint2 may be experimentally determined to compensate for luminance differences between a first pixel area AA1, a second pixel area AA2, and a third pixel area AA3.

Figure 7B:
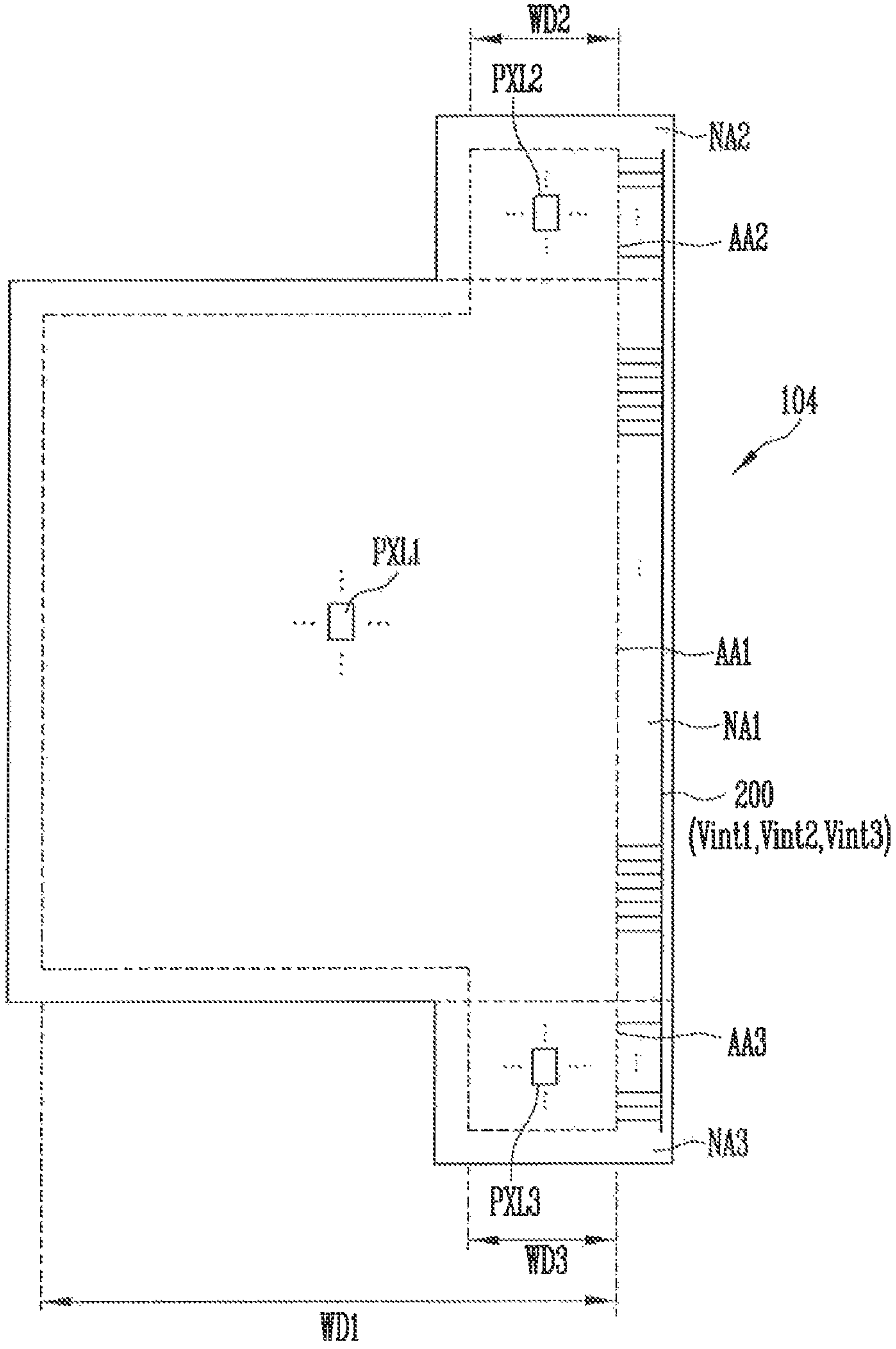

FIG. 7B shows a case where a second width WD2 and a third width WD3 are different.

Referring to FIG. 7B, a power supply line 200 is positioned at one side of a first peripheral area NA1, a second peripheral area NA2, and a third peripheral area NA3. The power supply line 200 is electrically coupled to second pixels PXL2, first pixels PXL1, and third pixels PXL3.

The power supply line 200 is supplied with a first initialization power supply Vint1, a second initialization power supply Vint2, and a third initialization power supply Vint3 from an outside source. For example, while driving transistors included in the first pixels PXL1 are initialized, a voltage of the first initialization power supply Vint1 are supplied to the power supply line 200. In addition, while driving transistors included in the second pixels PXL2 are initialized, a voltage of the second initialization power supply Vint2 is supplied to the power supply line 200. In addition, while driving transistors included in the third pixels PXL3 are initialized, a voltage of the third initialization power supply Vint3 is supplied to the power supply line 200.

In this case, the first initialization power supply Vint1, the second initialization power supply Vint2, and the third initialization power supply Vint3 are set to compensate for luminance differences between a first pixel area AA1, a second pixel area AA2, and a third pixel area AA3.

Figure 7C:
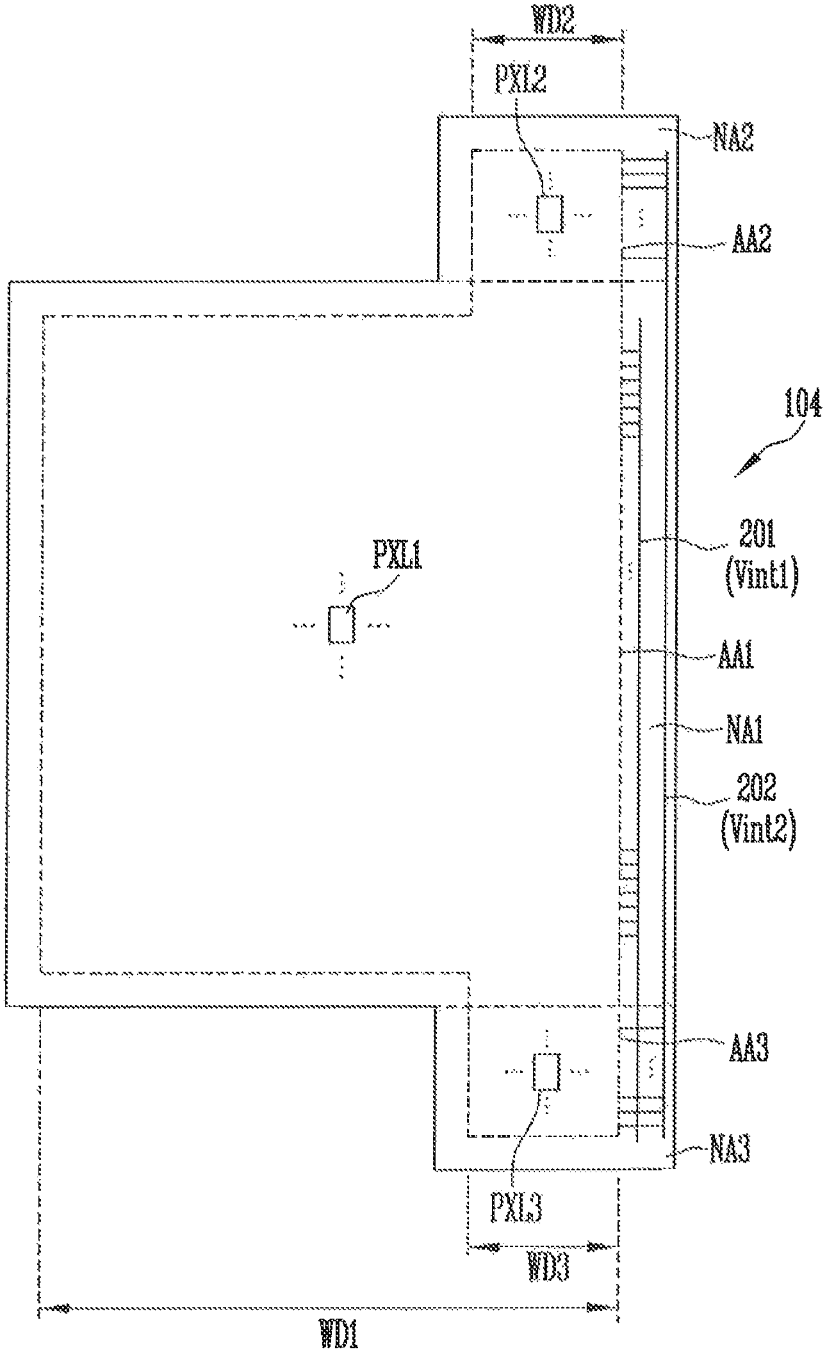

FIG. 7C shows a case where a second width WD2 and a third width WD3 are the same.

Referring to FIG. 7C, the first power supply line 201 is positioned at one side of the first peripheral area NA1, and is electrically coupled to the first pixels PXL1. The first power supply line 201 supplies a voltage of the first initialization power supply Vint1 to the first pixels PXL1. In an embodiment, the first power supply line 201 is supplied with the voltage of the first initialization power supply Vint1 from an outside source via the second peripheral area NA2 or the third peripheral area NA3.

A second power supply line 202 is positioned at one side of each of the second peripheral area NA2 and the third peripheral area NA3, and is electrically coupled to second pixels PXL2 and third pixels PXL3. For example, the second power supply line 202 is not connected to the first pixels PXL1. The second power supply line 202 provides a voltage of the second initialization power supply Vint2 to the second pixels PXL2 and the second pixels PXL3.

In this case, the voltages of the first initialization power supply Vint1 and the second initialization power supply Vint2 are set to be different from each other, and are set to compensate for luminance differences between a first pixel area AA1, a second pixel area AA2, and a third pixel area AA3.

Figure 7D:
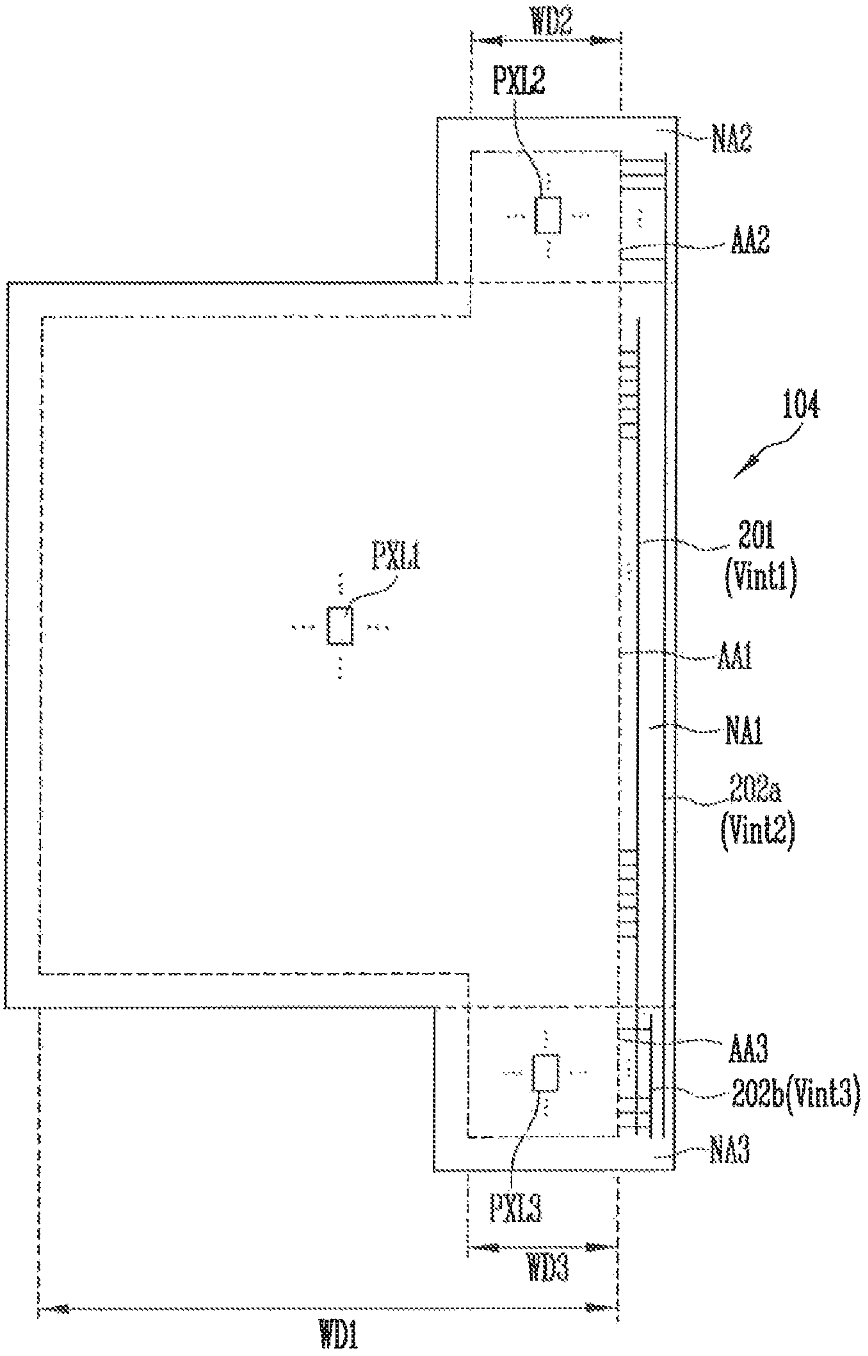

FIG. 7D shows a case where a second width WD2 and a third width WD3 are different.

Referring to FIG. 7D, a first power supply line 201 is positioned at one side of a first peripheral area NA1, and is electrically coupled to first pixels PXL1. The first power supply line 201 supplies a voltage of the first initialization power supply Vint1 to the first pixels PXL1. The first power supply line 201 may be supplied with the voltage of the first initialization power supply Vint1 from an outside source via a second peripheral area NA2 or a third peripheral area NA3.

A second power supply line 202*a* is positioned at one side of the second peripheral area NA2, and is electrically coupled to second pixels PXL2. The second power supply lines 202*a* supplies a voltage of the second initialization power supply Vint2 to the second pixels PXL2. The second power supply line 202*a* may be supplied with the voltage of the second initialization power supply Vint2 from an outside source via the first peripheral area NA1 or the third peripheral area NA3.

A third power supply line 202*b* is positioned at one side of the third peripheral area NA3, and is electrically coupled to third pixels PXL3. The third power supply line 202*b* supplies a voltage of the third initialization power supply Vint3 to the third pixels PXL3.

In this case, the first initialization power supply Vint1, the second initialization power supply Vint2, and the third initialization power supply Vint3 are set to compensate for luminance differences between a first pixel area AA1, a second pixel area AA2, and a third pixel area AA3.

Figure 8:
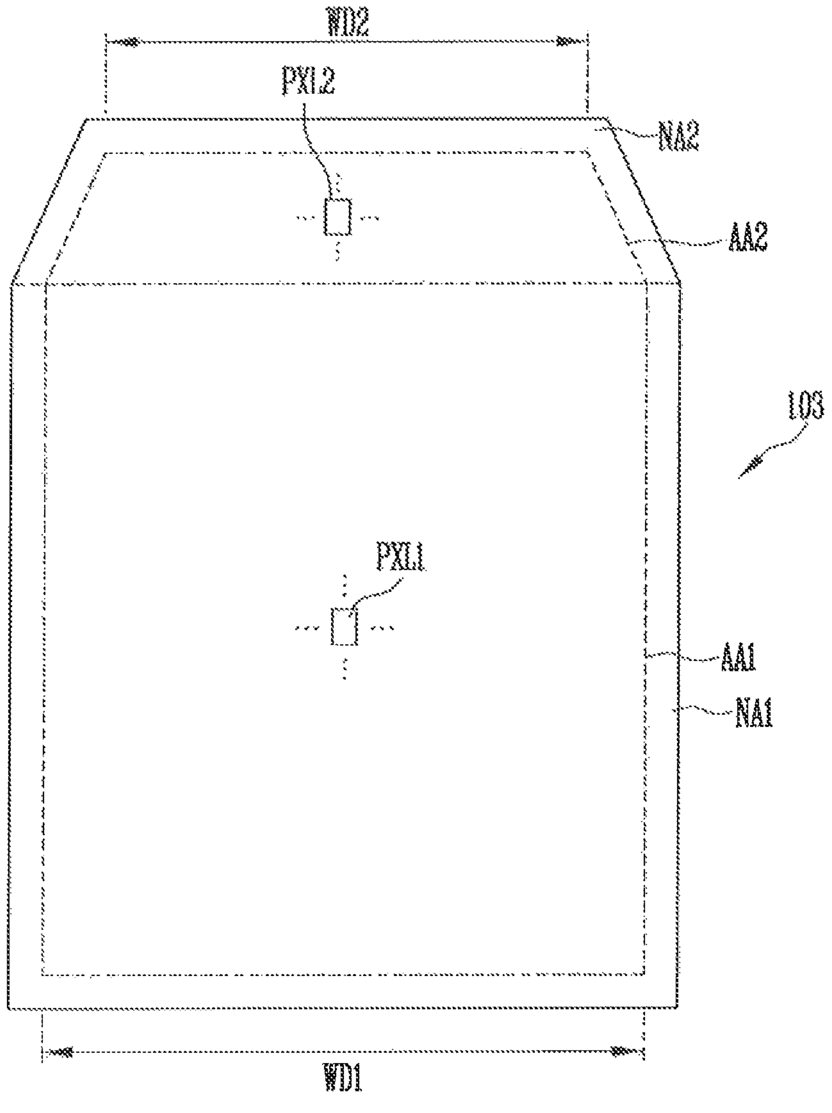
FIG. 8 shows a substrate according to an exemplary embodiment of the present invention.

FIG. 8 shows a substrate according to an exemplary embodiment of the present invention.

Referring to FIG. 8, a substrate 103 according to the current exemplary embodiment of the present invention includes pixel areas AA1 and AA2, and peripheral areas NA1 and NA2. Here, the pixel areas AA1 and AA2 are set as a display area for displaying a predetermined image, and the peripheral areas NA1 and NA2 are set as a non-display area.

The first pixel area AA1 has a first width WD1. Part of the second pixel area AA2 is set to have a second width WD2. In an embodiment, the first width WD1 is greater than the second width WD2, and accordingly, the first pixel area AA1 is greater than the second pixel area AA2.

First pixels PXL1 are formed in the first pixel area AA1 that has the first width WD1. The first pixels PXL1 display a predetermined image in the first pixel area AA1.

The second pixel area AA2 has a width that gradually decreases from the first width WD1 to the second width WD2. In this case, at least one horizontal line has different numbers of the second pixels PXL2 that are formed in the second pixel area AA2. For example, more second pixels PXL2 may be disposed in the horizontal line included in the second pixel area AA2 adjacent to the first pixel area AA1. For example, a horizontal row located in the second pixel area AA2 closest to the first pixel area AA1 has more pixels than a horizontal row located in the second pixel area AA2 located farthest from the first pixel area AA1. Additionally, FIG. 8 shows that the second pixel area AA2 is obliquely formed with its width gradually decreased, but the present invention is not limited thereto. For example, the second pixel area AA2 may be curvedly formed to have a width that gradually decreases.

In addition, FIG. 8 shows that the second pixel area AA2 is disposed adjacent to an upper part of the first pixel area AA1, but the present invention is not limited thereto. For example, the second pixel area AA2 may be may be disposed adjacent to the upper or lower part of the first pixel area AA1.

Additionally, the widths WD1, WD2, and WD3 used for the above description may be variously set according to a size of the substrate. That is, the widths WD1, WD2, and WD3 may be wide or narrow relative to each other, so numerical values thereof are not particularly limited.

Components for driving the pixels PXL1 and PXL2 may be positioned in the peripheral areas NA1 and NA2.

The first peripheral area NA1 may be present in a periphery of the first pixel area AA1, and may surround at least some of the first pixel area AA1.

The second peripheral area NA2 may be present in a periphery of the second pixel area AA2, and may surround at least some of the second pixel area AA2.

The first pixels PXL1 and the second pixels PXL2 include a driving transistor and an OLED, respectively. The driving transistor controls an amount of current supplied to the OLED according to a data signal. Before receiving the data signal, a gate electrode of the driving transistor is initialized to a voltage of the initialization power supply.

FIGS. 9A to 9D show exemplary embodiments of power supply lines formed on the substrate of FIG. 8. In FIGS. 9A to 9D, for better understanding and ease of description, only a configuration of power supply lines of components positioned in peripheral areas NA1 and NA2 will be shown.

Figure 9A:
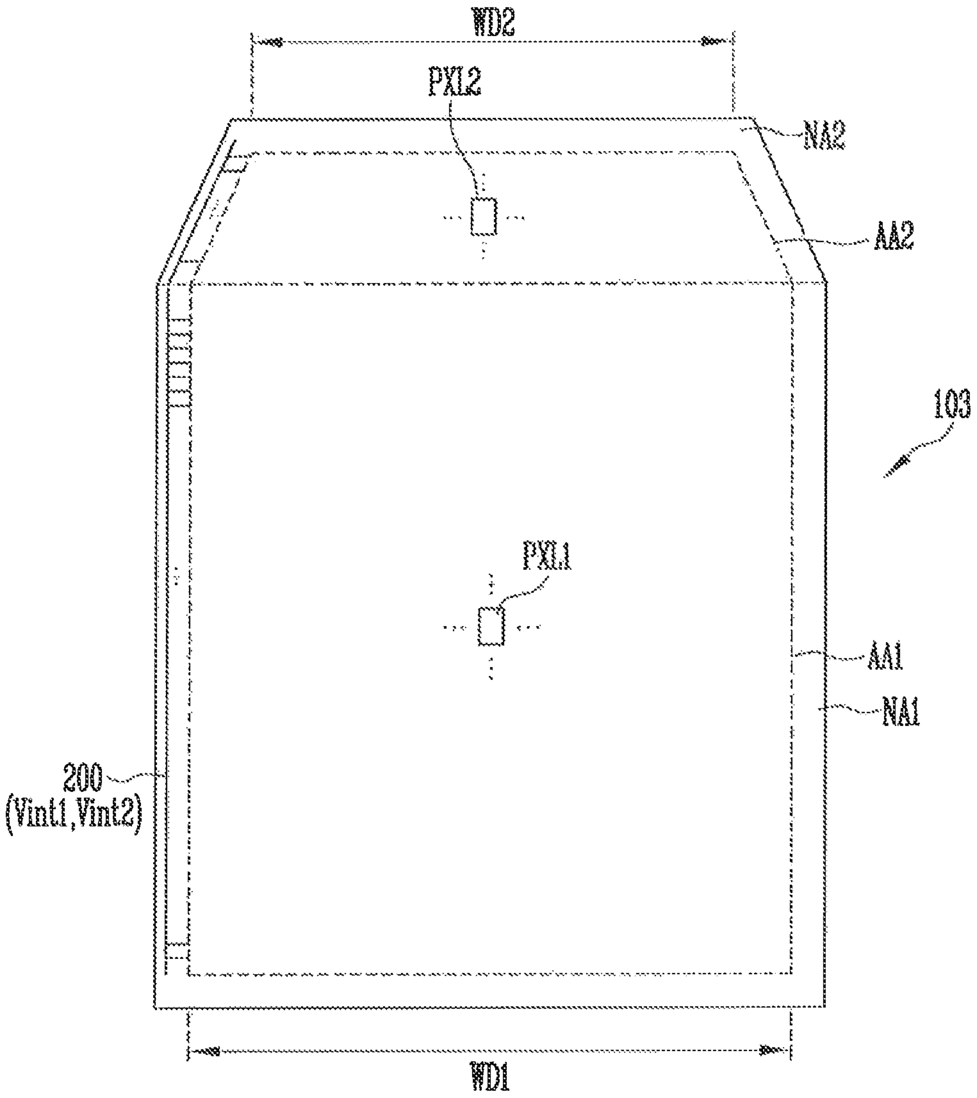
FIGS. 9A to 9D show exemplary embodiments of power supply lines formed on the substrate of FIG. 8.

Referring to FIG. 9A, a power supply line 200 is positioned at one side of a first peripheral area NA1 and a second peripheral area NA2. The power supply line 200 is electrically coupled to first pixels PXL1 and second pixels PXL2.

The power supply line 200 is supplied with a first initialization power supply Vint1 and a second initialization power supply Vint2 from the outside. For example, while driving transistors included in the first pixels PXL1 are initialized, a voltage of the first initialization power supply Vint1 may be supplied to the power supply line 200. In addition, while driving transistors included in the second pixels PXL2 are initialized, a voltage of the second initialization power supply Vint2 may be supplied to the power supply line 200.

In this case, the first initialization power supply Vint1 and the second initialization power supply Vint2 are set to different voltages. For example, the voltages of the first initialization power supply Vint1 and the second initialization power supply Vint2 are set to compensate for a luminance difference between a first pixel area AA1 and a second pixel area AA2.

Figure 9B:
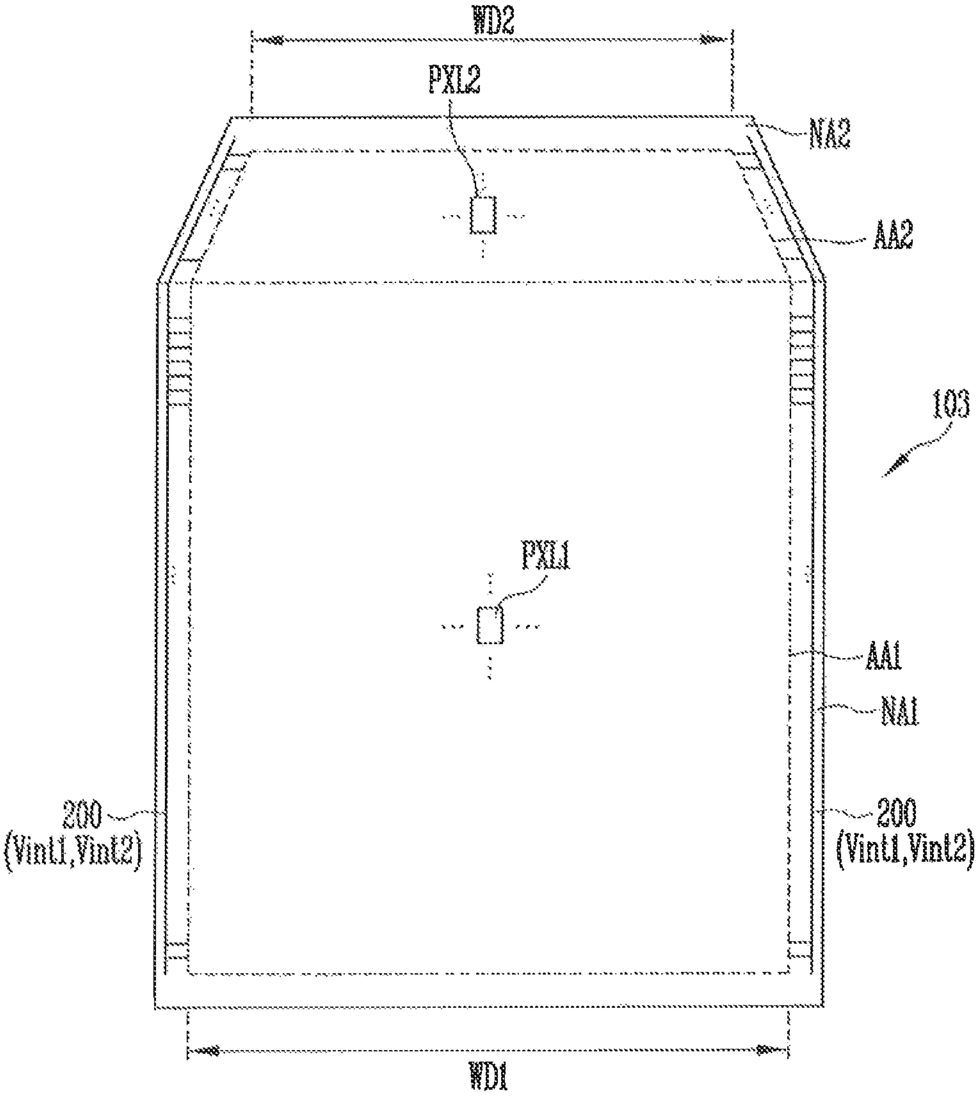

In an embodiment shown in FIG. 9B, a power supply line 200 is positioned at opposite sides of a first peripheral area NA1 and a second peripheral area NA2 while interposing a first pixel area AA1 and a second pixel area AA2 therebetween. For example, the supply line 200 may include a first power line extending through the left side of the first and second peripheral areas NA1 and NA2 and a second power line extending through the right side of the first and second peripheral areas NA1 and NA2.

Figure 9C:
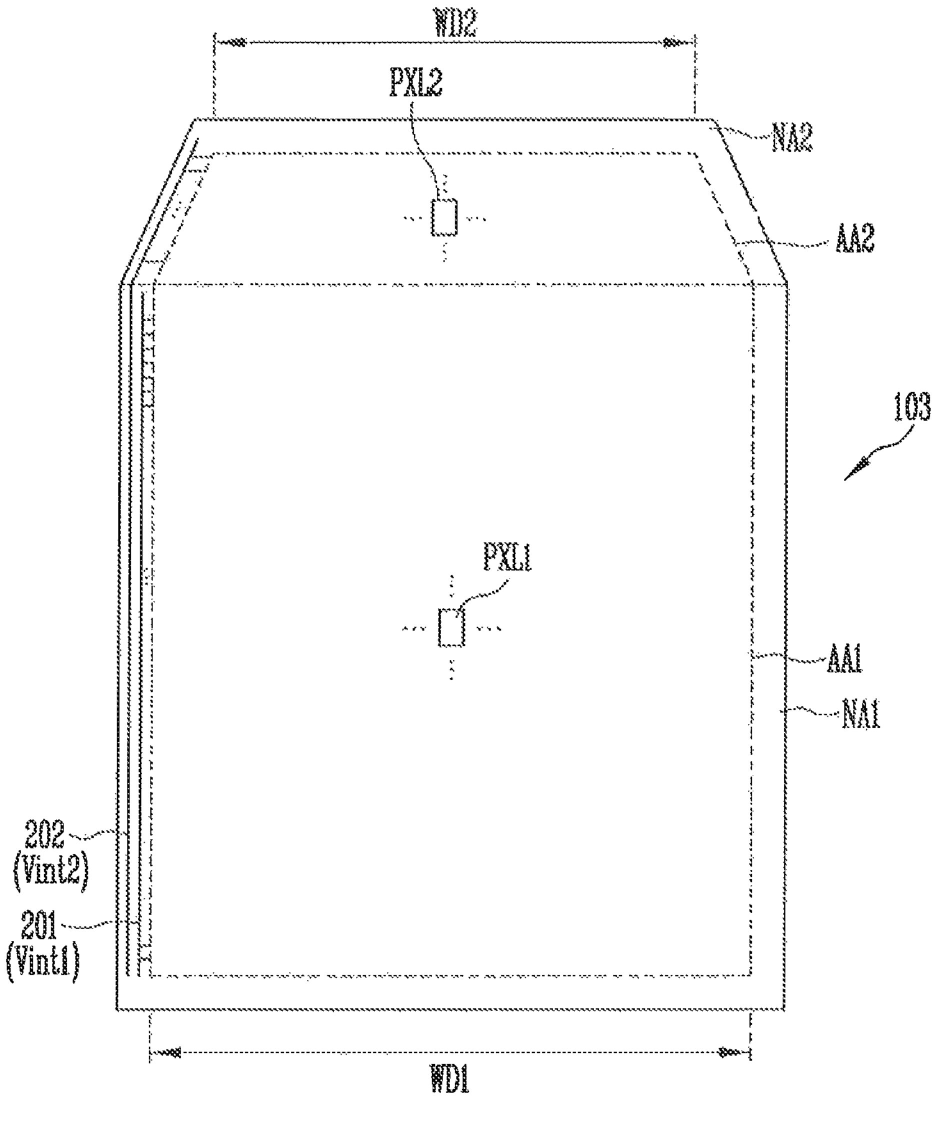

Referring to FIG. 9C, a first power supply line 201 is positioned at one side of a first peripheral area NA1, and a second power supply line 202 is positioned at one side of a second peripheral area NA2. In this case, the second power supply line 202 may extend to the second peripheral area NA2 via the first peripheral area NA1.

The first power supply line 201 is electrically coupled to first pixels PXL1. The first power supply line 201 supplies a voltage of the first initialization power supply Vint1 to the first pixels PXL1.

The second power supply line 202 is electrically coupled to second pixels PXL2. The second power supply line 202 supplies a voltage of the second initialization power supply Vint2 to the second pixels PXL2.

In this case, the voltages of the first initialization power supply Vint1 and the second initialization power supply Vint2 are set to be different from each other, and are set to compensate for a luminance difference between a first pixel area AA1 and a second pixel area AA2.

Figure 9D:
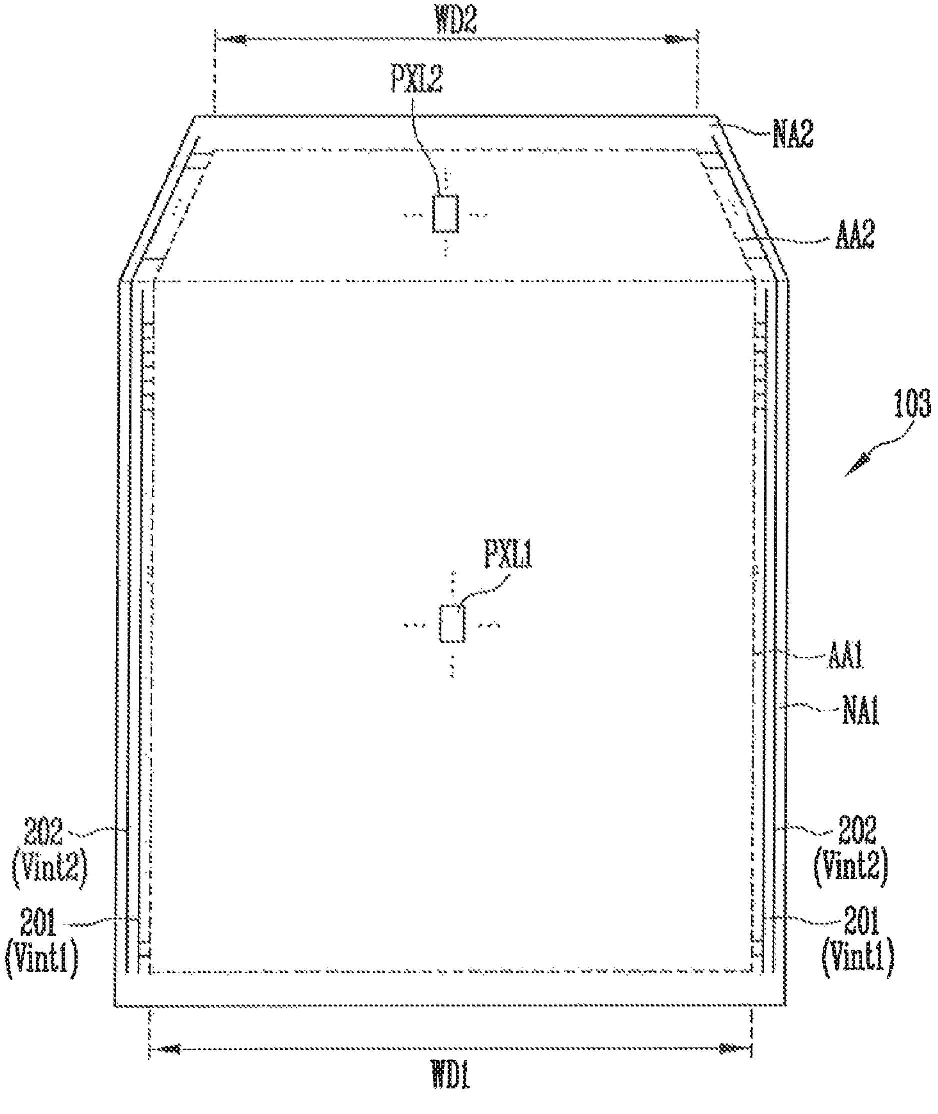

In an exemplary embodiment shown in FIG. 9D, a first power supply line 201 and a second power supply line 202 are positioned at opposite sides of a first peripheral area NA1 and a second peripheral area NA2 while interposing a first pixel area AA1 and a second pixel area AA2 therebetween. For example, the first power supply line 201 may include a first power line extending through the left side of the first peripheral area NA1 and a second power line extending through the right side of the first peripheral area NA1. For example, the second power supply line 202 may include a first power line extending through the left side of the first and second peripheral areas AA1 and AA2 and a second power line extending through the right side of the first and second peripheral areas.

Figure 10:
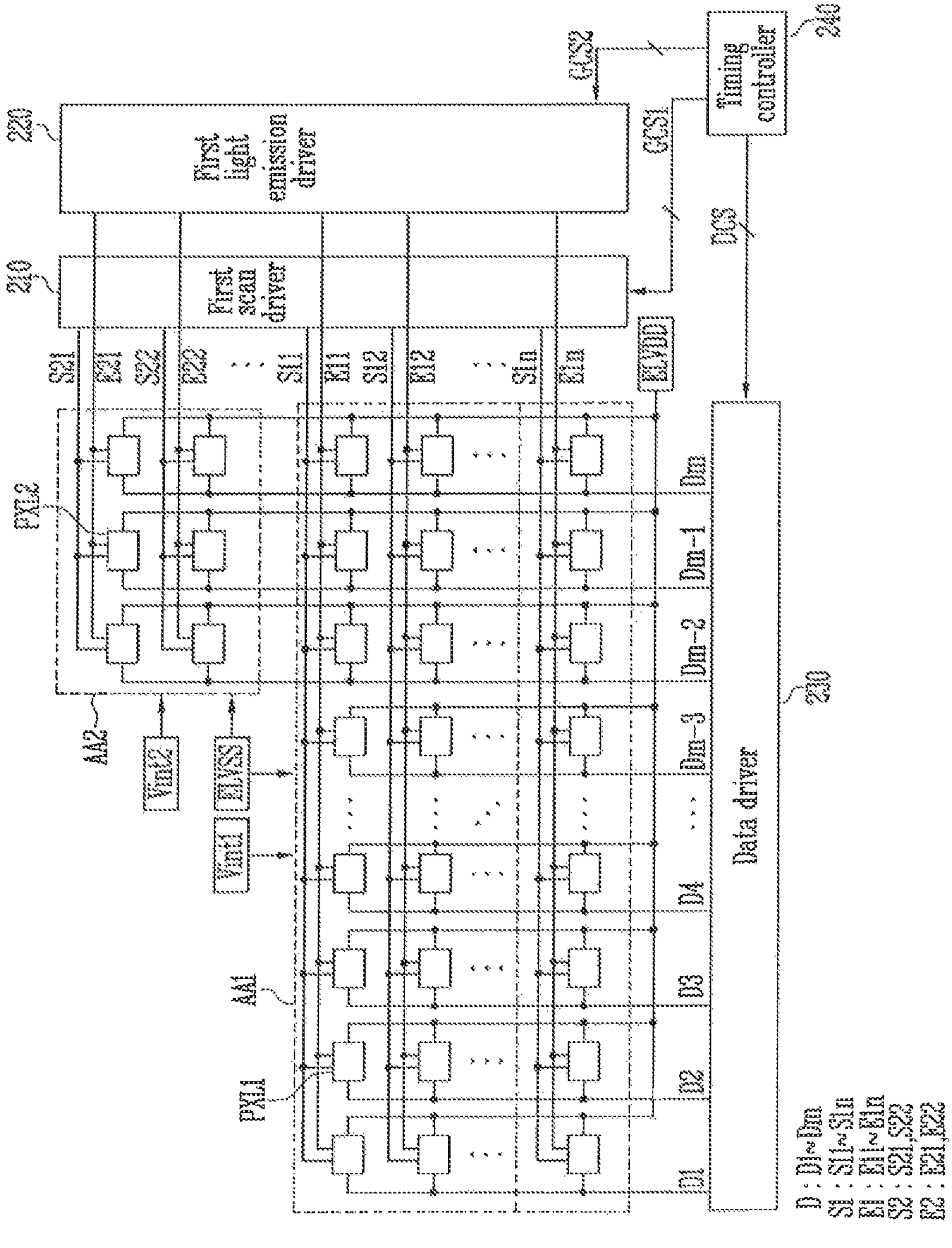
FIG. 10 shows an exemplary embodiment of an organic light emitting diode (OLED) display corresponding to the substrate of FIG. 1A.

FIG. 10 shows an exemplary embodiment of an OLED display corresponding to the substrate of FIG. 1A. In FIG. 10, initialization power supplies Vint1 and Vint2 are supplied to first pixels PXL1 and second pixels PXL2 by the power supply lines 200, 201, and 202 shown in FIGS. 2A to 2D.

Referring to FIG. 10, an OLED display according to the current exemplary embodiment of the present invention includes a first scan driver 210, a first light emission driver 220, a data driver 230, a timing controller 240, first pixels PXL1 and second pixels PXL2.

The first pixels PXL1 are formed in a first pixel area AA1 such that they are connected to first scan lines S11 to S1*n*, first light emission control lines E11 to E1*n*, and data lines D1 to Dm. When a scan signal is supplied from the first scan lines S11 to S1*n*, the first pixels PXL1 receive a data signal from the data lines D1 to Dm. The first pixels PXL1 supplied with the data signal control an amount of current that flows from a first power supply ELVDD to a second power supply ELVSS via an OLED (not shown). In an embodiment, the first power supply ELVDD is higher than the second power supply ELVSS.

The second pixels PXL2 are positioned in a second pixel area AA2 such that they are connected to second scan lines S21 and S22, second light emission control lines E21 and E22, and data lines Dm-2 to Dm. The second pixels PXL2 are supplied with the data signal from the data lines Dm-2 to Dm when the scan signal is supplied to the second scan lines S21 and S22. The second pixels PXL2 supplied with the data signal control an amount of current that flows from the first power supply ELVDD to the second power supply ELVSS via the OLED (not shown).

Additionally, in FIG. 10, six second pixels PXL2 are disposed in the second pixel area AA2 by two second scan lines S21 and S22, two second light emission control lines E21 and E22, and three data lines Dm-2 to Dm, but the present invention is not limited thereto. That is, a plurality of second pixels PXL2 is disposed according to a width WD2 of the second pixel area AA2, and the number of the second scan lines (e.g., S21 and S22), the second light emission control lines E2, and the data lines D may be variously set according to the second pixels PXL2.

In addition, at least one of a dummy scan line and a dummy light emission control line not shown may be additionally formed in the second pixel area AA2 according to a circuit structure of the second pixels PXL2. Similarly, at least one of a dummy scan line and a dummy light emission control line not shown may be additionally formed in the first pixel area AA1 according to a circuit structure of the first pixels PXL1.

The first scan driver 210 supplies the scan signal to the second scan lines (e.g., S21 and S22) and the first scan lines (e.g., S11, S12, . . . , S1*n*) in accordance with a first gate control signal GCS1 from the timing controller 240. For example, the first scan driver 210 may sequentially supply the scan signal to the second scan lines (e.g., S21 and S22) and the first scan lines (e.g., S11, S12, . . . , S1*n*). When the scan signal is sequentially supplied to the second scan lines (e.g., S21 and S22) and the first scan lines (e.g., S11, S12, . . . , S1*n*), the second pixels PXL2 and the first pixels PXL1 are sequentially selected in units of horizontal lines.

The first scan driver 210 may be mounted on a substrate 100 by using a thin film process. In addition, the first scan driver 210 may be mounted on opposite sides of the substrate while interposing the first pixel area AA1 and the second pixel area AA2 therebetween. In addition, the first pixel area AA1 and the second pixel area AA2 may be driven by different scan drivers, respectively. For example, the first scan driver 210 could include a first driver disposed on a first side of the substrate for driving the first pixel area AA1 and a second driver for driving the second pixel area AA2 that is disposed on a second side of the substrate that opposes the first side.

The first light emission driver 220 supplies a light emission control signal to the second light emission control lines (e.g., E21 and E22) and the first light emission control lines (e.g., E11, E12, . . . , E1*n*) in accordance with a second gate control signal GCS2 from the timing controller 240. For example, the first light emission driver 220 may sequentially supply the light emission control signal to the second light emission control lines (e.g., E21, and E22) and the first light emission control lines (e.g., E11, E12, . . . , E1*n*). The light emission control signal is used to control a light emitting time of the pixels PXL1 and PXL2. For this purpose, the light emission control signal may be set to have a wider width than the scan signal. In an exemplary embodiment, a pulse of the light emission control signal is wider than a pulse of the scan signal that corresponds to a gate-on voltage. In an embodiment, the scan signal is set to the gate-on voltage such that transistors included in the pixels PXL1 and PXL2 are turned on, and the light emission control signal is set to a gate-off voltage such that the transistors included in the pixels PXL1 and PXL2 are turned off.

The first light emission driver 220 may be mounted on the substrate 100 by using a thin film process. In addition, the first light emission driver 220 may be mounted on opposite sides of the substrate while interposing the first pixel area AA1 and the second pixel area AA2 therebetween. In addition, the first pixel area AA1 and the second pixel area AA2 may be driven by different light emission drivers, respectively. For example, the first light emission driver 220 could include a first driver disposed on a first side of the substrate for driving the first pixel area AA1 and a second driver for driving the second pixel area AA2 that is disposed on a second side of the substrate that opposes the first side.

The data driver 230 supplies the data signal to the data lines D1 to Dm in accordance with a data control signal DCS from the timing controller 240. The data signal supplied to the data lines D1 to Dm is supplied to the pixels PXL1 and PXL2 that are selected by the scan signal. In FIG. 10, the data driver 230 is shown such that it is disposed below the first pixel area AA1, but the present invention is not limited thereto. For example, the data driver 230 may be disposed above the first pixel area AA1.

The timing controller 240 supplies the first gate control signals GCS1 generated based on timing signals supplied from an outside source to the first scan driver 210, the second gate control signals GCS2 to the first light emission driver 220, and the data control signals DCS to the data driver 230.

Start pulse and clock signals are included in the gate control signals GCS1 and GCS2. The start pulse controls timing of a first scan signal or a first light emission control signal. The clock signals are used to shift the start pulse.

Source start pulse and clock signals are included in the data control signals DCS. The source start pulse controls a starting point of data sampling. The clock signals are used to control a sampling operation.

In an embodiment of the present invention, in order to compensate a luminance difference, a voltage of the first initialization power supply Vint1 is supplied to the first pixels PXL1, and a voltage of the second initialization power supply Vint2 is supplied to the second pixels.

More specifically, the first pixels PXL1 are positioned in the first pixel area AA1 that has a first width WD1, and the second pixels PXL2 are positioned in the second pixel area AA2 that has a second width WD2.

Figure 11:
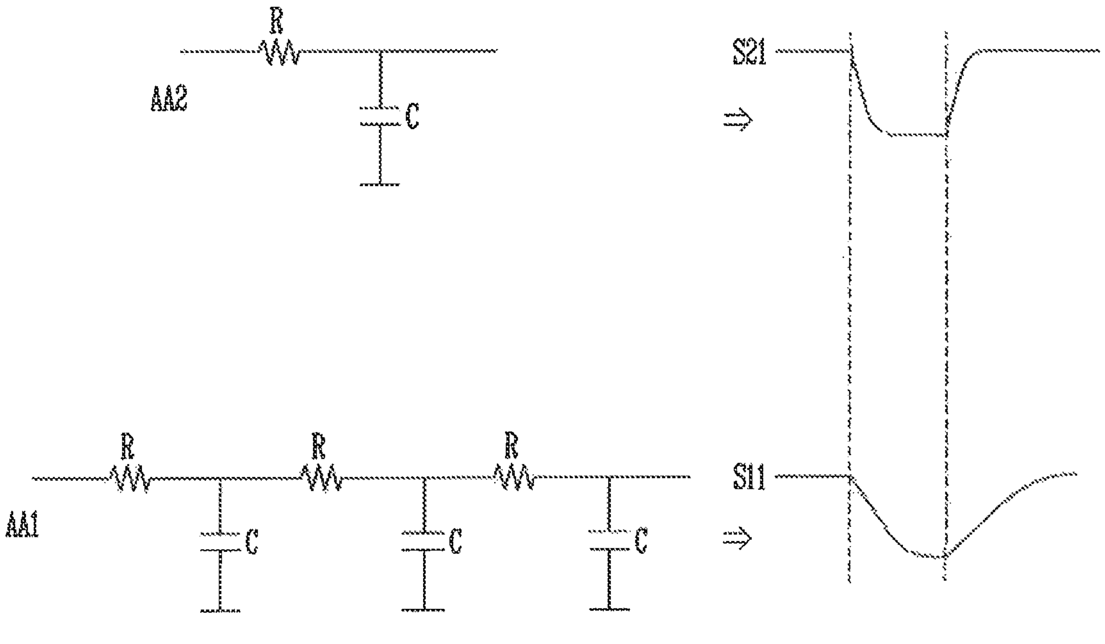
FIG. 11 shows an RC load of scan lines corresponding to a pixel area.

In this case, as shown in FIG. 11, an RC load of the first scan lines (e.g., S11, S12, . . . , S1*n*) positioned in the first pixel area AA1, and an RC load of the second scan lines (e.g., S21 and S22) positioned in the second pixel area AA2 are set to be different from each other. That is, the scan signal supplied to a first scan line (e.g., S11) has a longer delay than that supplied to a second scan line (e.g., S21).

Accordingly, when the data signal of the same gray scale is supplied, different voltages are stored in the first pixels PXL1 and the second pixels PXL2. That is, even if the data signal of the same gray scale is supplied, a luminance difference is generated between the first pixel area AA1 and the second pixel area AA2. For example, when the pixels PXL1 and PXL2 are formed by thin film transistor such as a positive metal oxide semiconductor (PMOS) as shown in FIG. 12, a darker screen is displayed in the second pixel area AA2 than in the first pixel area AA1 in accordance with the data signal of the same gray scale.

In the current exemplary embodiment of the present invention, the voltages of the first initialization power supply Vint1 supplied to the first pixels PXL1 and the second initialization power supply Vint2 supplied to the second pixels PXL2 are set to be different from each other such that a luminance difference between the first pixel area AA1 and the second pixel area AA2 are compensated.

In an exemplary embodiment, in an OLED display corresponding to the substrate of FIG. 1B, only the number of the second pixels PXL2 formed in each horizontal line of the second pixel area AA2 changes, but the configuration is the same. Accordingly, a detailed description of the OLED display corresponding to the substrate of FIG. 1B will be omitted.

Figure 12:
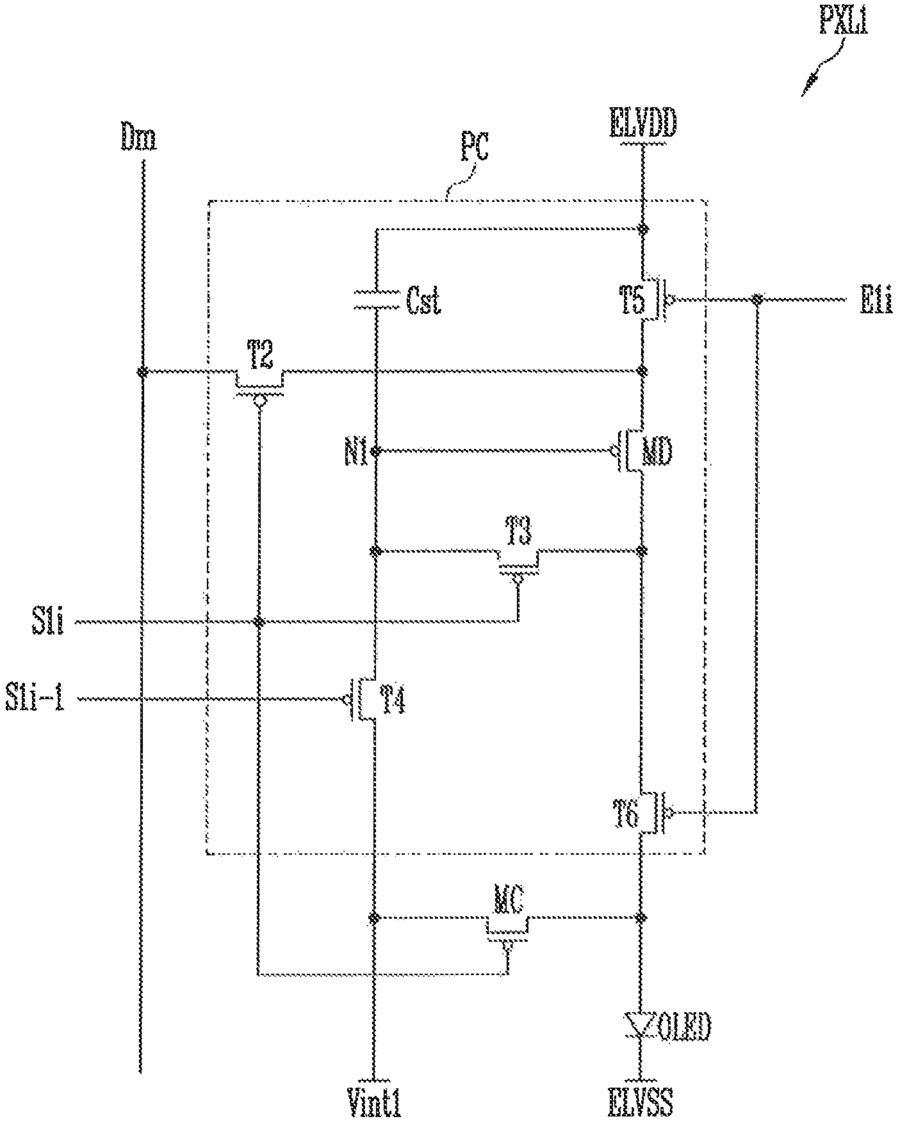
FIG. 12 shows an exemplary embodiment of a first pixel illustrated in FIG. 10.

FIG. 12 shows an exemplary embodiment of a first pixel illustrated in FIG. 10. In FIG. 12, for better understanding and ease of description, a circuit configuration will be described using a first pixel PXL1 that is connected to an m-th data line Dm and an i-th (i is a natural number) first scan line S1*i*.

Referring to FIG. 12, a first pixel PXL1 according to the current exemplary embodiment of the present invention includes a pixel circuit PC, a control transistor MC, and an OLED.

An anode of the OLED is connected to the pixel circuit PC, and a cathode thereof is connected to a second power supply ELVSS. The OLED generates light with a predetermined luminance in accordance with an amount of current supplied from the pixel circuit PC. In an embodiment, a first power supply ELVDD is set to have a higher voltage than the second power supply ELVSS to allow the current to flow through the OLED.

The control transistor MC is connected between a first initialization power supply Vint1 and the anode of the OLED. In addition, a gate electrode of the control transistor MC is connected to an i-th first scan line S1*i*. When a scan signal is supplied to the i-th first scan line S1*i*, the control transistor MC is turned on, and supplies a voltage of the first initialization power supply Vint1 to the anode of the OLED. In this case, the voltage of the first initialization power supply Vint1 is set to be lower than that of a data signal.

The pixel circuit PC includes a driving transistor MD, and second to sixth transistors T2 to T6.

A first electrode of the driving transistor MD is connected to a node receiving the first power supply ELVDD via the fifth transistor T5, and the second electrode thereof is connected to the anode of the OLED via the sixth transistor T6. In addition, a gate electrode of the driving transistor MD is connected to a first node N1. The driving transistor MD controls, according to a voltage of the first node N1, an amount of current that flows from the first power supply ELVDD to the second power supply ELVSS via the OLED.

The second transistor T2 is connected between an m-th data line Dm and the first electrode of the driving transistor MD. In addition, the gate electrode of the second transistor T2 is connected to an i-th first scan line S1*i*. When the scan signal is supplied to the i-th first scan line S1*i*, the second transistor T2 is turned on, and electrically couples the m-th data line Dm to the first electrode of the driving transistor MD.

The third transistor T3 is connected between a second electrode of the driving transistor MD and the first node N1. In addition, a gate electrode of the third transistor T3 is connected to the i-th first scan line S1*i*. When the scan signal is supplied to the i-th first scan line S1*i*, the third transistor T3 is turned on, and electrically couples the second electrode of the driving transistor MD to the first node N1. Accordingly, when the third transistor T3 is turned on, the driving transistor MD is diode-connected.

The fourth transistor T4 is connected between the first node N1 and a node receiving the first initialization power supply Vint1. In addition, a gate electrode of the fourth transistor T4 is connected to an i-1th first scan line S1*i*-1. When the scan signal is supplied to the i-1th first scan line S1*i*-1, the fourth transistor T4 is turned on, and supplies the voltage of the first initialization power supply Vint1 to the first node N1.

The fifth transistor T5 is connected between a node receiving the first power supply ELVDD and the first electrode of the driving transistor MD. In addition, a gate electrode of the fifth transistor T5 is connected to an i-th first light emission control line E1*i*. When a light emission control signal is supplied to the i-th first light emission control line E1*i*, the fifth transistor T5 is turned off, and is otherwise turned on.

The sixth transistor T6 is connected between the second electrode of the driving transistor MD and the anode of the OLED. In addition, a gate electrode of the sixth transistor T6 is connected to the i-th first light emission control line E1*i*. The sixth transistor T6 is turned off when the light emission control signal is supplied to the i-th first light emission control line E1*i*, and is otherwise turned on.

A storage capacitor Cst is connected between a node receiving the first power supply ELVDD and the first node N1. The storage capacitor Cst stores a voltage that corresponds to the data signal and a threshold voltage of the first transistor T1.

Figure 13:
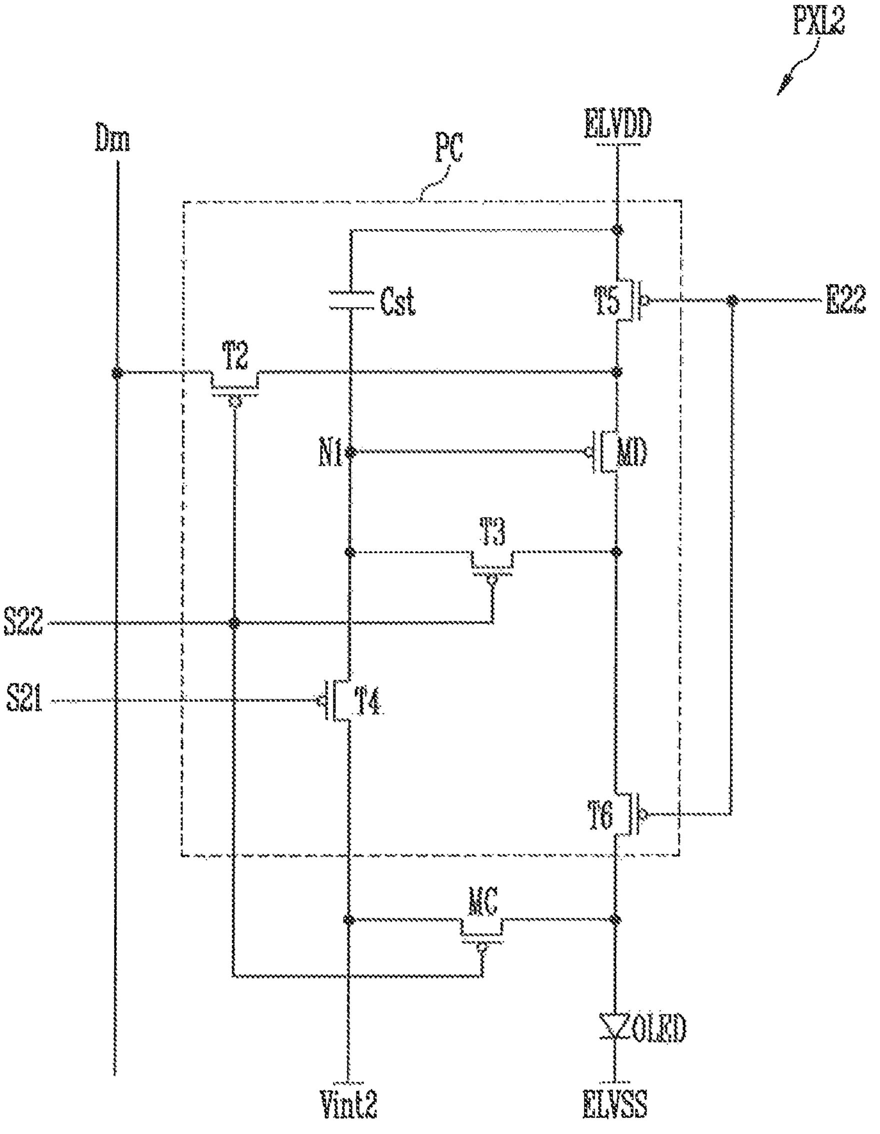
FIG. 13 shows an exemplary embodiment of a second pixel illustrated in FIG. 10.

In an exemplary embodiment, the second pixel PXL2 has, as shown in FIG. 13, the same circuit structure as the first pixel PXL1. However, depending on where the second pixel PXL2 is formed, signal lines S22, S21, and E22, which are connected to the transistors T2, T3, T4, T5, T6, and MC, are changed.

In addition, a control transistor MC included in the second pixel PXL2 is connected to a second initialization power supply Vint2. The second initialization power supply Vint2 is set to have a lower voltage than the data signal. In addition, the second initialization power supply Vint2 is set to have a different voltage than the first initialization power supply Vint1.

Figure 14:
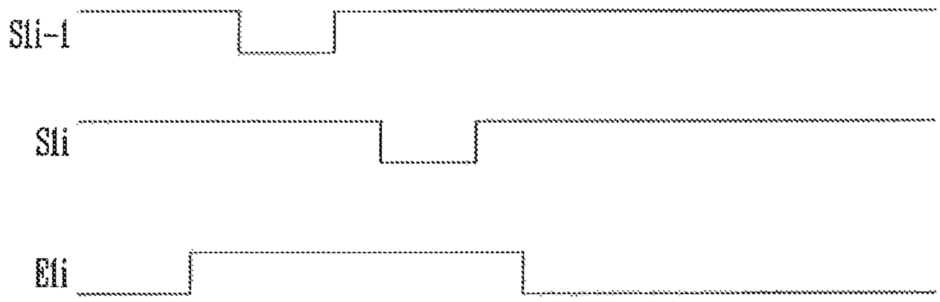
FIG. 14 shows a waveform diagram of an exemplary embodiment of a driving method of the first pixel illustrated in FIG. 12.

FIG. 14 shows a waveform diagram of an exemplary embodiment of a driving method of the first pixel illustrated in FIG. 12.

Referring to FIG. 14, a light emission control signal is first supplied to an i-th first light emission control line E1*i*. When the light emission control signal is supplied to the i-th first light emission control line E1*i*, a fifth transistor T5 and a sixth transistor T6 are turned off.

When the fifth transistor T5 is turned off, a node receiving a first power supply ELVDD and a first electrode of a driving transistor MD are electrically disconnected from each other. When the sixth transistor T6 is turned off, a second electrode of the driving transistor MD and an anode of the OLED are electrically disconnected from each other. Accordingly, while the light emission control signal is supplied to the i-th first light emission control line E1*i*, a first pixel PXL1 is set to be in a non-emitting state.

After the light emission control signal is supplied to the i-th first light emission control line E1*i*, a scan signal is supplied to an i-1th first scan line S1*i*-1. When the scan signal is supplied to the i-1th first scan line S1*i*-1, a fourth transistor T4 is turned on. When the fourth transistor T4 is turned on, a voltage of a first initialization power supply Vint1 is supplied to a first node N1.

After the scan signal is supplied to the i-1th first scan line S1*i*-1, the scan signal is supplied to the i-th first scan line S1*i*. When the scan signal is supplied to the i-th first scan line S1*i*, a second transistor T2, a third transistor T3, and a control transistor MC are turned on.

When the third transistor T3 is turned on, the second electrode of the driving transistor MD and the first node N1 are electrically coupled to each other. That is, when the third transistor T3 is turned on, the driving transistor MD is diode-connected.

When the second transistor T2 is turned on, a data signal from a data line Dm is supplied to a first electrode of the driving transistor MD. In this case, since the first node N1 is set to a voltage of the first initialization power supply Vint1 that is lower than that of the data signal, the driving transistor MD is turned on. When the driving transistor MD is turned on, a voltage obtained by subtracting an absolute value of a threshold voltage of the driving transistor MD from a voltage of the data signal is supplied to the first node N1. In this case, a storage capacitor Cst stores a voltage corresponding to that of the first node N1.

In an exemplary embodiment, when the control transistor MC is turned on, the voltage of the first initialization power supply Vint1 is supplied to the anode of the OLED. Then, a parasitic capacitor of the OLED (not shown) is initialized to the voltage of the first initialization power supply Vint1.

After a voltage corresponding to the data signal and the threshold voltage of the driving transistor MD is charged to the storage capacitor Cst, the light emission control signal is no longer supplied to the i-th first light emission control line E1*i*.

When the light emission control signal is no longer supplied to the i-th first light emission control line E1*i*, the fifth transistor T5 and the sixth transistor T6 are turned on. When the fifth transistor T5 is turned on, a node receiving the first power supply ELVDD and the first electrode of the driving transistor MD are electrically coupled to each other. When the sixth transistor T6 is turned on, the second electrode of the driving transistor MD and the anode of the OLED are electrically coupled to each other. In this case, the driving transistor MD controls, according to a voltage of the first node N1, an amount of current that flows from the first power supply ELVDD to a second power supply ELVSS via the OLED. Then, the OLED generates light with a predetermined luminance according to the amount of current supplied from the driving transistor MD.

Similarly, a second pixel PXL2 illustrated in FIG. 13 is also driven by using the same method for the first pixel PXL1. Accordingly, a detailed description thereof will be omitted.

In an exemplary embodiment, when the pixels PXL1 and PXL2 are formed as shown in FIGS. 12 and 13, the timing of when to provide the first initialization power supply Vint1 and the second initialization power supply Vint2 to a power supply line 200 may be controlled such that they are synchronized to the scan signal.

For example, while the scan signal is supplied to at least some of the second scan lines (e.g., S21), the voltage of the second initialization power supply Vint2 may be supplied to the power supply line 200. In addition, from a time point where the scan signal is supplied to the last second scan line, the voltage of the first initialization power supply Vint1 may be supplied to the power supply line 200.

Figure 15A:
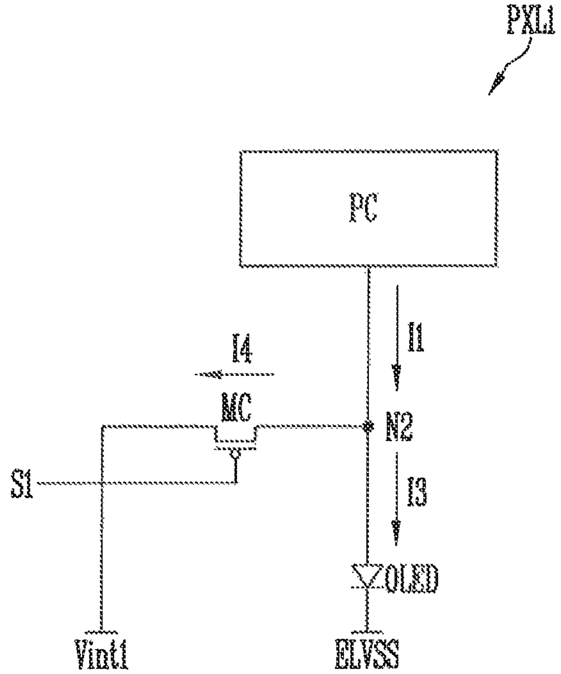
FIGS. 15A and 15B show a leakage current corresponding to an initialization power supply.
Figure 15B:
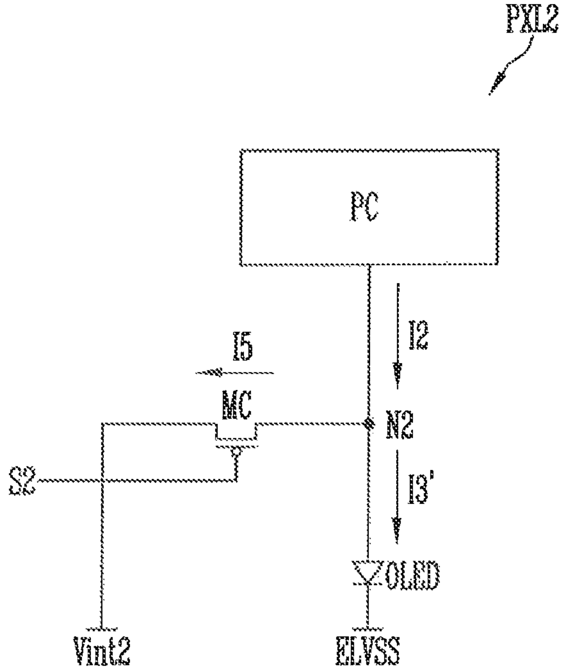

FIGS. 15A and 15B show leakage currents in accordance with initialization power supplies. In FIGS. 15A and 15B, a description will be made assuming that a data signal of the same gray scale is supplied to a first pixel PXL1 and a second pixel PXL2.

First, as described with reference to FIGS. 10 and 11, even if an RC load of first scan lines (e.g., S11 and S12) and an RC load of second scan lines (e.g., S21 and S22) cause the data signal of the same gray scale to be supplied, a luminance difference is generated between a first pixel area AA1 and a second pixel area AA2. That is, when the first pixel PXL1 and the second pixel PXL2 are configured as shown in circuits of FIGS. 12 and 13, a darker screen is displayed in the second pixel area AA2 than in the first pixel area AA1.

Figure 16:
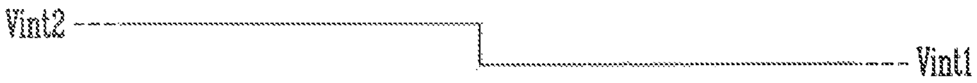
FIG. 16 shows an embodiment of voltage values of first and second initialization power supplies.

To improve the luminance difference between the first pixel area AA1 and the second pixel area AA2, a voltage of a first initialization power supply Vint1 supplied to the first pixel area AA1 may, as shown in FIG. 16, be set lower than a voltage of a second initialization power supply Vint2.

More specifically, referring to FIGS. 15A and 15B, the pixel circuit PC included in the first pixel PXL1 supplies a first current I1 to a second node N2 according to a data signal of a specific gray scale during a light emitting period. In addition, during the light emitting period, the pixel circuit PC included in the second pixel PXL2 provides a second current I2 to the second node N2. In this case, the first current I1 is set to be higher than second current I2.

In an exemplary embodiment, during the light emitting period, a control transistor MC maintains a turned-off state. However, even if the control transistor MC maintains the turned-off state, predetermined leakage currents I4 and I5 are supplied to the initialization power supplies Vint1 and Vint2.

For example, for the first pixel PXL1, a leakage current of the fourth current I4 is supplied to the first initialization power supply Vint1 from the second node N2 via the control transistor MC. In addition, for the second pixel PXL2, a leakage current of the fifth current I5 is supplied to the first initialization power supply Vint1 from the second node N2 via the control transistor MC.

In this case, since the first initialization power supply Vint1 is set to have a lower voltage than the second initialization power supply Vint2, the fourth current I4 is set to be higher than the fifth current I5. Then, currents supplied to the OLED from each of the first pixel PXL1 and the second pixel PXL2 may be set to third currents I3 and I3' such that they are similar to or the same as each other.

In other words, in the current exemplary embodiment of the present invention, the low voltage of the initialization power supply is supplied, according to the data signal of the same gray scale, to a region where a bright screen is displayed, and accordingly, a luminance difference between respective regions can be minimized.

In an exemplary embodiment of the present invention, methods for setting voltages of initialization power supplies Vint1 and Vint2 are not limited to the above description of FIG. 15A or FIG. 16. For example, the voltages of the initialization power supplies Vint1 and Vint2 may be variously set according to circuit structures of the pixels PXL1 and PXL2, and conductive types of the transistors (e.g., P-type, N-type) forming the pixels PXL1 and PXL2.

That is, in an embodiment of the present invention, when various pixel areas of different widths are included, the voltage of the initialization power supply Vint supplied to each pixel area is controlled to minimize the luminance difference between the pixel areas.

Figure 17:
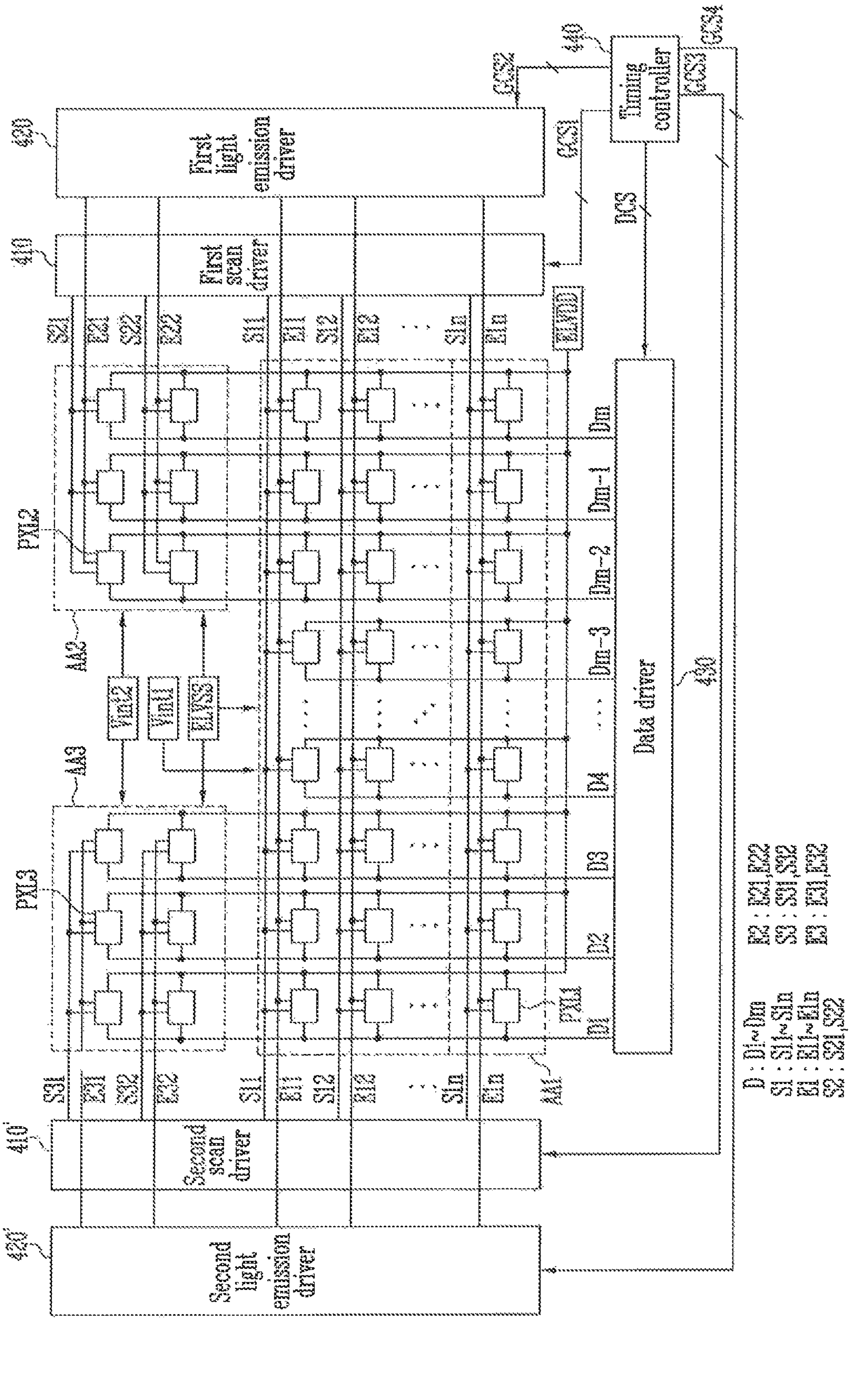
FIG. 17 shows an exemplary embodiment of an OLED display corresponding to the substrate of FIG. 3.

FIG. 17 shows an exemplary embodiment of an OLED display corresponding to the substrate of FIG. 3. FIG. 17 shows a case in which a second width WD2 and a third width WD3 are the same. In FIG. 17, initialization power supplies Vint1 and Vint2 are supplied to first pixels PXL1 and second pixels PXL2 by power supply lines 200*a*, 200*b*, 201, 202*a*, and 202*b* that are shown in FIGS. 4A to 4C.

Referring to FIG. 17, an OLED display according to the current exemplary embodiment of the present invention includes a first scan driver 410, a first light emission driver 420, a second scan driver 410', a second light emission driver 420', a data driver 430, a timing controller 440, first pixels PXL1, second pixels PXL2, and third pixels PXL3.

The first pixels PXL1 are positioned in a first pixel area AA1 to be connected to first scan lines S11 to S1*n*, first light emission control lines E11 to E1*n*, and data lines D1 to Dm. When a scan signal is supplied from the first scan lines S11 to S1*n*, the first pixels PXL1 receive a data signal from the data lines D1 to Dm. The first pixels PXL1 supplied with the data signal controls an amount of current that flows from a first power supply ELVDD to a second power supply ELVSS via an OLED.

The second pixels PXL2 are positioned in a second pixel area AA2 to be connected to second scan lines S21 and S22, second light emission control lines E21 and E22, and data lines Dm-2 to Dm. The second pixels PXL2 receive the data signal from the data lines Dm-2 to Dm when the scan signal is supplied to the second scan lines S21 and S22. The second pixels PXL2 supplied with the data signal control an amount of current that flows from the first power supply ELVDD to the second power supply ELVSS via the OLED. In this case, the number of the second pixels PXL2, which are arranged in accordance with a width of the second pixel area AA2, may be variously determined, and the number of the second scan lines S2, the second light emission control lines E2, and the data lines D may be variously set in accordance with the second pixels PXL2.

The third pixels PXL3 are positioned in a third pixel area AA3 to be connected to third scan lines S31 and S32, third light emission control lines E31 and E32, and data lines D1 to D3. The third pixels PXL3 receive the data signal from the data lines D1 to D3 when the scan signal is supplied to the third scan lines S31 and S32. The third pixels PXL3 supplied with the data signal controls an amount of current that flows from a first power supply ELVDD to a second power supply ELVSS via the OLED. In this case, the number of the third pixels PXL3, which are arranged in accordance with a width of the third pixel area, may be variously determined, and the numbers of the third scan lines S3, the third light emission control lines E3, and the data lines D may be variously set in accordance with the third pixels PXL3.

Additionally, according to circuit structures of the first pixels PXL1, the second pixels PXL2, and the third pixels PXL3, at least one of dummy scan lines and dummy light emission control lines which are not shown may be additionally formed in the first pixel area AA1, the second pixel area AA2, and the third pixel area AA3.

The first scan driver 410 supplies the scan signal to the second scan lines (e.g., S21 and S22) and the first scan lines (e.g., S11 and S12) according to a first gate control signal GCS1 from the timing controller 440. For example, the first scan driver 410 may sequentially supply the scan signal to the second scan lines (e.g., S21 and S22) and the first scan lines (e.g., S11-S1*n*). When the scan signal is sequentially supplied to the second scan lines (e.g., S21 and S22) and the first scan lines (e.g., S11-S1*n*), the second pixels PXL2 and the first pixels PXL1 are sequentially selected in units of horizontal lines.

The second pixel area AA2 and the first pixel area AA1 are shown in FIG. 17 to be driven by the same scan driver 410, but the present invention is not limited thereto. For example, the second pixel area AA2 and the first pixel area AA1 may be driven by different scan drivers.

The first light emission driver 420 supplies, according to a second gate control signal GCS2 from the timing controller 440, a light emission control signal to the second light emission control lines (e.g., E21 and E22) and the first light emission control lines (e.g., E11-E1*n*). For example, the first light emission driver 420 may sequentially supply the light emission control signal to the second light emission control lines (e.g., E21 and E22) and the first light emission control lines (e.g., E11-E1*n*).

The second pixel area AA2 and the first pixel area AA1 are shown in FIG. 17 to be driven by the same light emission driver 420, but the present invention is not limited thereto. For example, the second pixel area AA2 and the first pixel area AA1 may be driven by different light emission drivers.

The second scan driver 410' supplies, according to a third gate control signal GCS3 from the timing controller 440, the scan signal to the third scan lines (e.g., S31 and S32) and the first scan lines (e.g., S11-S1*n*). For example, the second scan driver 410' may sequentially supply the scan signal to the third scan lines (e.g., S31 and S32) and the first scan lines (e.g., S11-S1*n*). When the scan signal is sequentially supplied to the third scan lines (e.g., S31 and S32) and the first scan lines (e.g., S11-S1*n*), the third pixels PXL3 and the first pixels PXL1 are sequentially selected in units of horizontal lines.

The third pixel area AA3 and the first pixel area AA1 are shown in FIG. 17 to be driven by the same scan driver 410', but the present invention is not limited thereto. For example, the third pixel area AA3 and the first pixel area AA1 may be driven by different scan drivers.

The second light emission driver 420' supplies, according to a fourth gate control signal GCS4 from the timing controller 440, the light emission control signal to the third light emission control lines (e.g., E31 and E32) and the first light emission control lines (e.g., E11-E1*n*). For example, the second light emission driver 420' may sequentially supply the light emission control signal to the third light emission control lines (e.g., E31 and E32) and the first light emission control lines (e.g., E11-E1*n*).

The third pixel area AA3 and the first pixel area AA1 are shown in FIG. 17 to be driven by the same light emission driver 420', but the present invention is not limited thereto. For example, the third pixel area AA3 and the first pixel area AA1 may be driven by different light emission drivers.

The data driver 430 supplies the data signal to the data lines D1 to Dm according to a data control signal DCS from the timing controller 440. The data signal supplied to the data lines D1 to Dm is supplied to the pixels PXL1, PXL2, and PXL3 that are selected by the scan signal. In this case, the data driver 430 is shown to be disposed below the first pixel area AA1, but the present invention is not limited thereto. For example, the data driver 430 may be disposed above the first pixel area AA1.

The timing controller 440 provides the first gate control signals GCS1 generated based on timing signals supplied from an outside source to the first scan driver 410, the second gate control signals GCS2 to the first light emission driver 420, the third gate control signals GCS3 to the second scan driver 410', the fourth gate control signals GCS4 to the second light emission driver 420', and the data control signals DCS to the data driver 430.

In an embodiment of the present invention, a voltage of a first initialization power supply Vint1 is supplied to the first pixels PXL1, and a voltage of a second initialization power supply Vint2 is supplied to the second pixels PXL2 and the third pixels PXL3, such that luminance differences are compensated.

More specifically, the first pixels PXL1 are positioned in the first pixel area AA1 that has a first width WD1, and the second pixels PXL2 are positioned in the second pixel area AA2 that has a second width WD2. In addition, the third pixels PXL3 are positioned in the third pixel area AA3 that has a third width WD3 that is the same as the second width WD2.

In this case, an RC load of the first scan lines (e.g., S11-S1*n*) positioned in the first pixel area AA1, and an RC load of the second scan lines (e.g., S21 and S22) (or the third scan lines S31-S32) positioned in the second pixel area AA2 (or the third pixel area AA3) are set to be different from each other. That is, the scan signal supplied to a first scan line (e.g., S11) has a longer delay than that supplied to the second scan line (e.g., S21) (or the third scan line (e.g., S31)).

Accordingly, when the data signal of the same gray scale is supplied, different voltages are stored in the first pixels PXL1 and the second pixels PXL2 (or the third pixel PXL3). That is, even if the data signal of the same gray scale is supplied, a luminance difference is generated between the first pixel area AA1 and the second pixel area AA2 (or the third pixel area AA3). For example, when the pixels PXL1, PXL2, and PXL3 are formed as shown in a PMOS of FIG. 12, a darker screen is displayed, according to the data signal of the same gray scale, in the second pixel area AA2 (or the third pixel area AA3) than in the first pixel area AA1.

In the current exemplary embodiment of the present invention, the voltages of the first initialization power supply Vint1 supplied to the first pixels PXL1 and the second initialization power supply Vint2 supplied to the second pixels PXL2 and the third pixels PXL3 are set to be different from each other such that the luminance difference between the first pixel area AA1 and the second pixel area AA2 (or the third pixel area AA3) are compensated. For example, the first initialization power supply Vint1 is set to have a lower voltage than the second initialization power supply Vint2, and accordingly, the luminance differences between the respective pixel areas AA1, AA2, and AA3 can be compensated.

Figure 18:
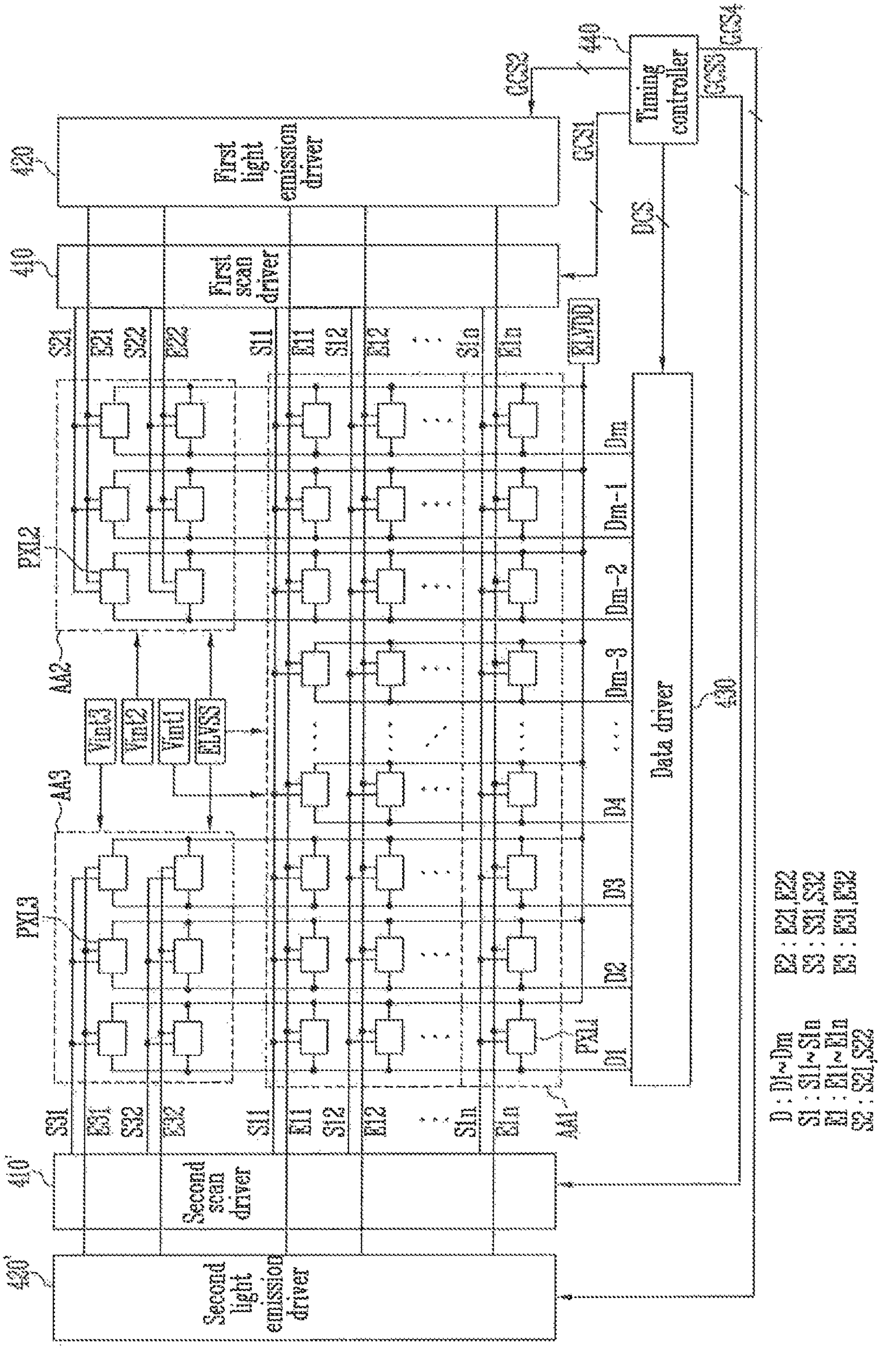
FIG. 18 shows an exemplary embodiment of the OLED display corresponding to the substrate of FIG. 3.

FIG. 18 shows an exemplary embodiment of an OLED display corresponding to the substrate of FIG. 3. FIG. 18 shows a case in which a second width WD2 and a third width WD3 are different from each other. When describing FIG. 18, a detailed description of the same configuration as that of FIG. 17 will be omitted.

Referring to FIG. 18, first pixels PXL1 are supplied with a first initialization power supply Vint1, and second pixels PXL2 are supplied with a second initialization power supply Vint2 that is different from the first initialization power supply Vint1. In addition, the third pixels PXL3 are supplied with the third initialization power supply Vint3 that is different from the first initialization power supply Vint1 and the second initialization power supply Vint2.

The first pixels PXL1 are positioned in a first pixel area AA1 that has a first width WD1, and the second pixels PXL2 are positioned in a second pixel area AA2 that has a second width WD2. In addition, the third pixels PXL3 are positioned in a third pixel area AA3 that has a third width WD3, which is different from the second width WD2.

In this case, an RC load of the first scan lines S1 positioned in the first pixel area AA1, an RC load of the second scan lines S2 positioned in the second pixel area AA2, and an RC load of the third scan lines S3 positioned in the third pixel area AA3 are set to be different from each other.

Accordingly, when the data signal of the same gray scale is supplied, different voltages are stored in the first pixels PXL1, the second pixels PXL2 and the third pixels PXL3. That is, even if the data signal of the same gray scale is supplied, luminance differences are generated between the first pixel area AA1, the second pixel area AA2, and the third pixel area AA3.

In the current exemplary embodiment of the present invention, the voltages of the first initialization power supply Vint1, the second initialization power supply Vint2, and the third initialization power supply Vint3 are set to be different from each other such that the luminance differences between the first pixel area AA1, the second pixel area AA2, and the third pixel area AA3 are compensated. In this case, the voltages of the first initialization power supply Vint1, the second initialization power supply Vint2, and the third initialization power supply Vint3 may be experimentally determined to minimize the luminance differences in the pixel areas AA1, AA2, and AA3 according to circuit structures of the pixels PXL1, PXL2, and PXL3.

An actual configuration of the substrate of FIG. 6 is the same as that of the OLED display of FIGS. 17 and 18, except for the position of the third pixel area AA3. Accordingly, a detailed description of the substrate of FIG. 6 will be omitted.

Figure 19:
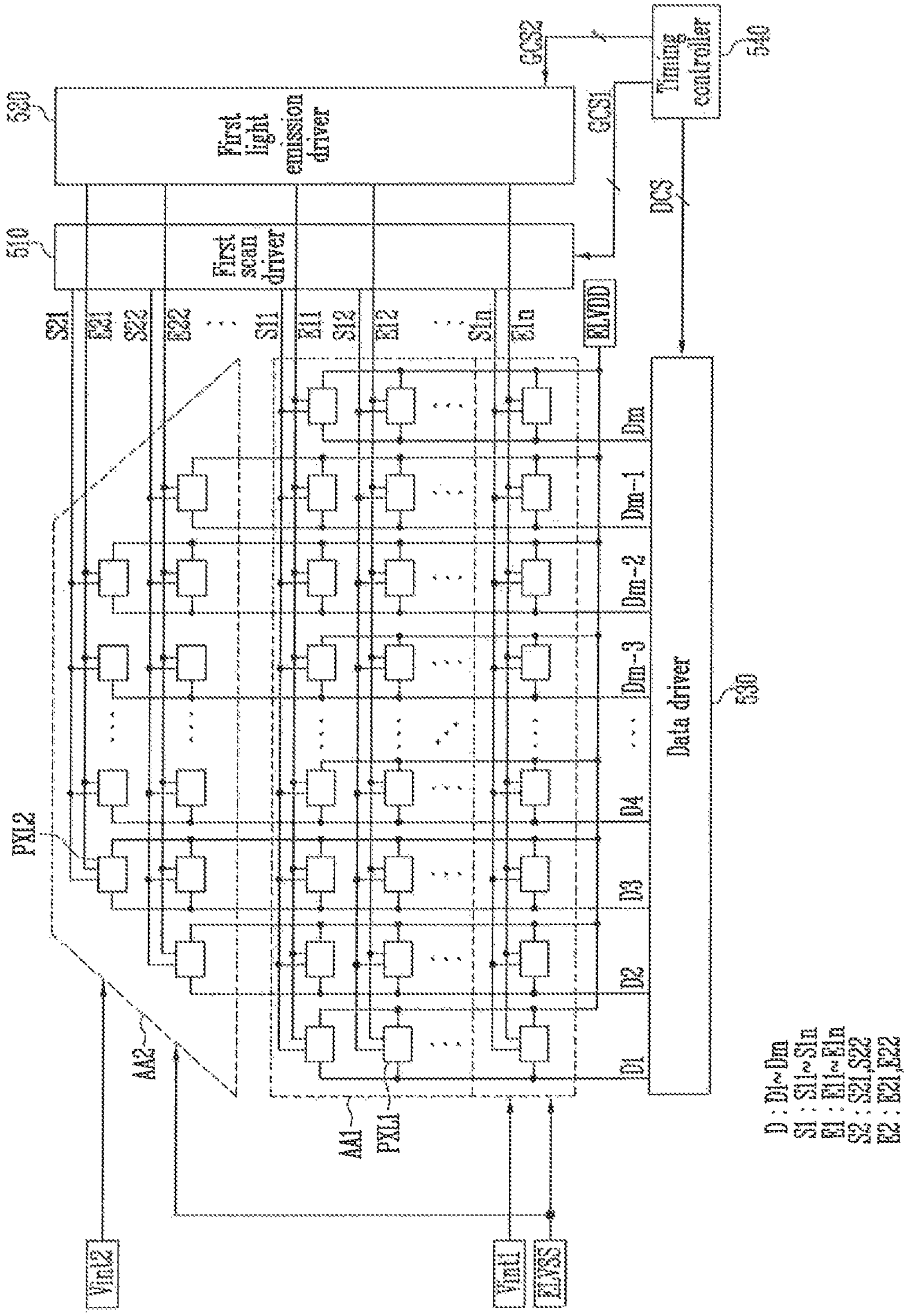
FIG. 19 shows an exemplary embodiment of an OLED display corresponding to the substrate of FIG. 8.

FIG. 19 shows an exemplary embodiment of an OLED display corresponding to the substrate of FIG. 8. In FIG. 19, initialization power supplies Vint1 and Vint2 are supplied to first pixels PXL1 and second pixels PXL2 by power supply lines 200, 201, and 202 that are shown in FIGS. 9A to 9D.

Referring to FIG. 19, an OLED display according to the current exemplary embodiment of the present invention includes a first scan driver 510, a first light emission driver 520, a data driver 530, a timing controller 540, first pixels PXL1, and second pixels PXL2.

The first pixels PXL1 are positioned in a first pixel area AA1 to be connected to first scan lines S11 to S1*n*, first light emission control lines E11 to E1*n*, and data lines D1 to Dm. When a scan signal is supplied from the first scan lines S11 to S1*n*, the first pixels PXL1 receive a data signal from the data lines D1 to Dm. The first pixels PXL1 supplied with the data signal controls an amount of current that flows from a first power supply ELVDD to a second power supply ELVSS via an OLED. In an embodiment, the first pixel area AA1 has a trapezoidal shape. For example, the first pixels PXL1 may be arranged in a trapezoidal shape such that there are less pixels in an upper row of the trapezoid having a smallest width and there are more pixels in a lowest row of the trapezoid having a largest width.

The second pixels PXL2 are positioned in a second pixel area AA2 to be connected to second scan lines S21 and S22, second light emission control lines E21 and E22, and data lines D2 to Dm-1. The second pixels PXL2 are supplied with a data signal from the data lines D2 to Dm-1 when the scan signal is supplied to the second scan lines S21 and S22. The second pixels PXL2 supplied with the data signal control an amount of current that flows from a first power supply ELVDD to a second power supply ELVSS via an OLED. In an embodiment, the second pixel area AA2 has a rectangular shape. For example, each row of the second pixel area AA2 includes a same number of pixels.

In this case, the second pixel area AA2 is set to have a width that gradually decreases from a first width WD1 to a second width WD2. Accordingly, the numbers of the second pixels PXL2 formed in each of at least one or more horizontal lines are set to be different. In this case, loads of the second scan lines S2 in units of at least one or more horizontal lines are different in the second pixel area AA2, and accordingly, a luminance difference may be generated in units of at least one or more horizontal lines.

Figure 20:
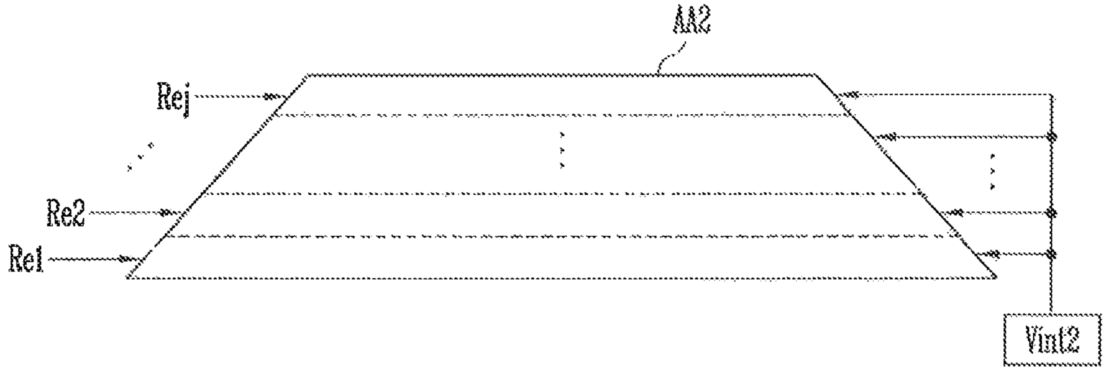
FIG. 20 shows an exemplary embodiment of a second pixel area illustrated in FIG. 19.

In an embodiment of the present invention, in order to prevent the luminance differences in units of horizontal lines, the second pixel area AA2 may, as shown in FIG. 20, be divided into j (j is a natural number of 2 or more) regions including at least one horizontal lines Re1, . . . , Rej.

The first scan driver 510 supplies, according to a first gate control signal GCS1 from the timing controller 540, the scan signal to the second scan lines (e.g., S21 and S22) and the first scan lines (e.g., S11-S1*n*). For example, the first scan driver 510 may sequentially supply the scan signal to the second scan lines (e.g., S21 and S22) and the first scan lines (e.g., S11-S1*n*). When the scan signal is sequentially supplied to the second scan lines S2 and the first scan lines S1, the second pixels PXL2 and the first pixels PXL1 are sequentially selected in units of horizontal lines.

In FIG. 19, the second pixel area AA2 and the first pixel area AA1 are shown to be driven by the same scan driver 510, but the present invention is not limited thereto. For example, the second pixel area AA2 and the first pixel area AA1 may be driven by different scan drivers.

The first light emission driver 520 supplies, according to a second gate control signal GCS2 from the timing controller 540, a light emission control signal to the second light emission control lines (e.g., E21 and E22) and the first light emission control lines (e.g., E11-E1*n*). For example, the first light emission driver 520 may sequentially supply the light emission control signal to the second light emission control lines (e.g., E21 and E22) and the first light emission control lines (e.g., E11-E1*n*).

In FIG. 19, the second pixel area AA2 and the first pixel area AA1 are shown to be driven by the same light emission driver 520, but the present invention is not limited thereto. For example, the second pixel area AA2 and the first pixel area AA1 may be driven by different light emission drivers.

The data driver 530 supplies the data signal to the data lines D1 to Dm according to a data control signal DCS from the timing controller 540. The data signal supplied to the data lines D1 to Dm is supplied to the pixels PXL1 and PXL2 that are selected by the scan signal. Here, the data driver 530 is shown to be disposed below the first pixel area AA1, but the present invention is not limited thereto. For example, the data driver 53 may be disposed above the first pixel area AA1.

The timing controller 540 supplies the first gate control signals GCS1 generated based on timing signals supplied from an outside source to the first scan driver 510, the second gate control signals GCS2 to the first light emission driver 520, and the data control signals DCS to the data driver 530.

In an embodiment of the present invention, a voltage of a first initialization power supply Vint1 is supplied to the first pixels PXL1, and a voltage of a second initialization power supply Vint2 is supplied to the second pixels, such that a luminance difference is compensated.

More specifically, the first pixels PXL1 positioned in the first pixel area AA1 has a first width WD1, and at least some regions of the second pixels PXL2 are positioned in the second pixel area AA2 that has a second width WD2.

In this case, an RC load of the first scan lines (e.g., S11-S1*n*) positioned in the first pixel area AA1 and an RC load of the second scan lines (e.g., S21 and S22) positioned in the second pixel area AA2 are set to be different from each other. That is, the scan signal supplied to a first scan line (e.g., S21) has a longer delay than that supplied to a second scan line (e.g., S21).

Accordingly, when the data signal of the same gray scale is supplied, different voltages are stored in the first pixels PXL1 and the second pixels PXL2. That is, even if the data signal of the same gray scale is supplied, a luminance difference is generated between the first pixel area AA1 and the second pixel area AA2.

In the current exemplary embodiment of the present invention, the voltages of the first initialization power supply Vint1 supplied to the first pixels PXL1 and the second initialization power supply Vint2 supplied to the second pixels PXL2 are set to be different from each other, so that a luminance difference between the first pixel area AA1 and the second pixel area AA2 can be compensated. For example, the first initialization power supply Vint1 may be set to have a lower voltage than the second initialization power supply Vint2, and accordingly, the luminance difference between the pixel areas AA1 and AA2 can be compensated.

As shown in FIG. 20, the second pixel area AA2 may be divided into j regions Re1 to Rej. In this case, the j regions Re1 to Rej are respectively set to have different widths, and accordingly, even if the data signal of the same gray scale is supplied, luminance differences may be generated in each of the j regions Re1 to Rej.

The second initialization power supply Vint2 may be set to have different voltages in each of the j regions Re1 to Rej such that the luminances are compensated. For example, according to the same gray scale, a lower second initialization power supply Vint2 is supplied a region in which brighter luminance is generated, and accordingly, uniform luminance can be implemented in the j regions Re1 to Rej.

In a display device according to an exemplary embodiment of the present invention and a driving method thereof, different voltages of the initialization power supply are supplied to each of the pixel areas having different widths. In this case, the voltages of the initialization power supply are set to compensate for the luminance difference between the pixel areas, and accordingly, an image of uniform luminance can be displayed.

Although exemplary embodiments of the present inventive concept have been described for illustrative purposes, various modifications, additions and substitutions are possible, without departing from the scope and spirit of the inventive concept.

What is claimed is:

1. A display device comprising:

a first pixel area comprising first pixels, wherein each first pixel comprises a first driving transistor initialized to a first voltage supplied through a power supply line; and a second pixel area comprising second pixels, wherein each second pixel comprises a second driving transistor initialized to a second voltage supplied through the power supply line, wherein the power supply line is positioned at one side of a peripheral area of the first and second pixel areas, wherein the first voltage is supplied to a gate electrode of the first driving transistor, and wherein the second voltage is supplied to a gate electrode of the second driving transistor.

2. The display device of claim 1, wherein the first voltage and the second voltage are supplied to the power supply line at different times.

3. The display device of claim 2, wherein the first voltage is supplied to the power supply line during a period in which the first driving transistors are initialized, and the second voltage is supplied to the power supply line during a period in which the second driving transistors are initialized.

4. The display device of claim 1, wherein the first pixel area has a first width in a direction substantially parallel to a scan line extending in the first pixel area and the second pixel area has a second width in the direction, and wherein the first width is different from the second width.

5. The display device of claim 4, wherein the first width is greater than the second width.

6. The display device of claim 5, wherein the second width gradually decreases away from the first pixel area.

* * * * *